(12) United States Patent
Behm et al.

(10) Patent No.: US 6,899,621 B2
(45) Date of Patent: May 31, 2005

(54) SYSTEM AND METHOD FOR SELLING LOTTERY GAME TICKETS

(76) Inventors: William F. Behm, 12180 King Rd., Roswell, GA (US) 30075; James C. Kennedy, Jr., 440 Watergate Way, Roswell, GA (US) 30076; Benjamin Eric Mitchell, 5906 Clairmont Way, Powder Springs, GA (US) 30127; Edward W. Wahler, 1120 Cane Creek Rd., Fletcher, NC (US) 28732

( * ) Notice: Subject to any disclaimer, the term of this patent is extended or adjusted under 35 U.S.C. 154(b) by 394 days.

(21) Appl. No.: 09/794,726

(22) Filed: Feb. 27, 2001

(65) Prior Publication Data

US 2002/0119817 A1 Aug. 29, 2002

(51) Int. Cl.[7] ................................ A63F 9/24
(52) U.S. Cl. ........................ 463/17; 463/42; 705/14; 235/383
(58) Field of Search ................ 463/16, 17, 25, 463/40–42; 273/138.1, 138.2, 143 R, 139, 269; 705/14, 16, 21; 235/383, 375, 380; 186/61; 902/22, 23; 379/93.13; 283/48.1, 49, 50, 51, 52

(56) References Cited

U.S. PATENT DOCUMENTS

| | | | | |
|---|---|---|---|---|
| 4,815,741 A | * | 3/1989 | Small ........................ 463/17 |
| 5,007,641 A | * | 4/1991 | Seidman ..................... 463/17 |
| 5,216,595 A | | 6/1993 | Protheroe ................... 364/412 |
| 5,239,165 A | | 8/1993 | Novak ......................... 235/375 |
| 5,451,052 A | | 9/1995 | Behm et al. ................. 273/139 |
| 5,560,610 A | | 10/1996 | Behm et al. ................. 273/269 |
| 5,588,649 A | | 12/1996 | Blumberg et al. ............ 463/18 |
| 5,772,511 A | | 6/1998 | Smeltzer ..................... 463/17 |
| 5,871,398 A | | 2/1999 | Schneier et al. ............. 463/16 |
| 5,897,625 A | * | 4/1999 | Gustin et al. ................. 705/43 |
| 6,119,099 A | | 9/2000 | Walker et al. ................ 705/16 |
| 6,267,670 B1 | | 7/2001 | Walker et al. ................ 463/17 |

* cited by examiner

Primary Examiner—Mark Sager
(74) Attorney, Agent, or Firm—Needle & Rosenberg, PC.

(57) ABSTRACT

A system and method of selling pre-printed lottery game tickets, on-line lottery game tickets, or a combination of pre-printed and on-line lottery game tickets in a retail store is disclosed. At least one lottery game token is provided bearing a game identification code thereon for being scanned at a POS terminal provided as a part of an in-store POS network. The scanned identification code is detected by a POS monitor in communication with the POS terminal, the POS monitor determining from the scanned code the type of lottery game to be played. The POS monitor, or a separate ticket controller in communication with the POS monitor, will then issue a dispense ticket command to a ticket dispenser located at the POS terminal for each pre-printed lottery game to be played. For each on-line lottery game to be played, the detection of the game identification code will result in the generation of a random series of lottery play numbers, whereupon the POS monitor or the ticket controller will instruct a lottery ticket printer located at the POS terminal to print at least one lottery ticket thereat bearing the lottery play numbers thereon.

210 Claims, 9 Drawing Sheets

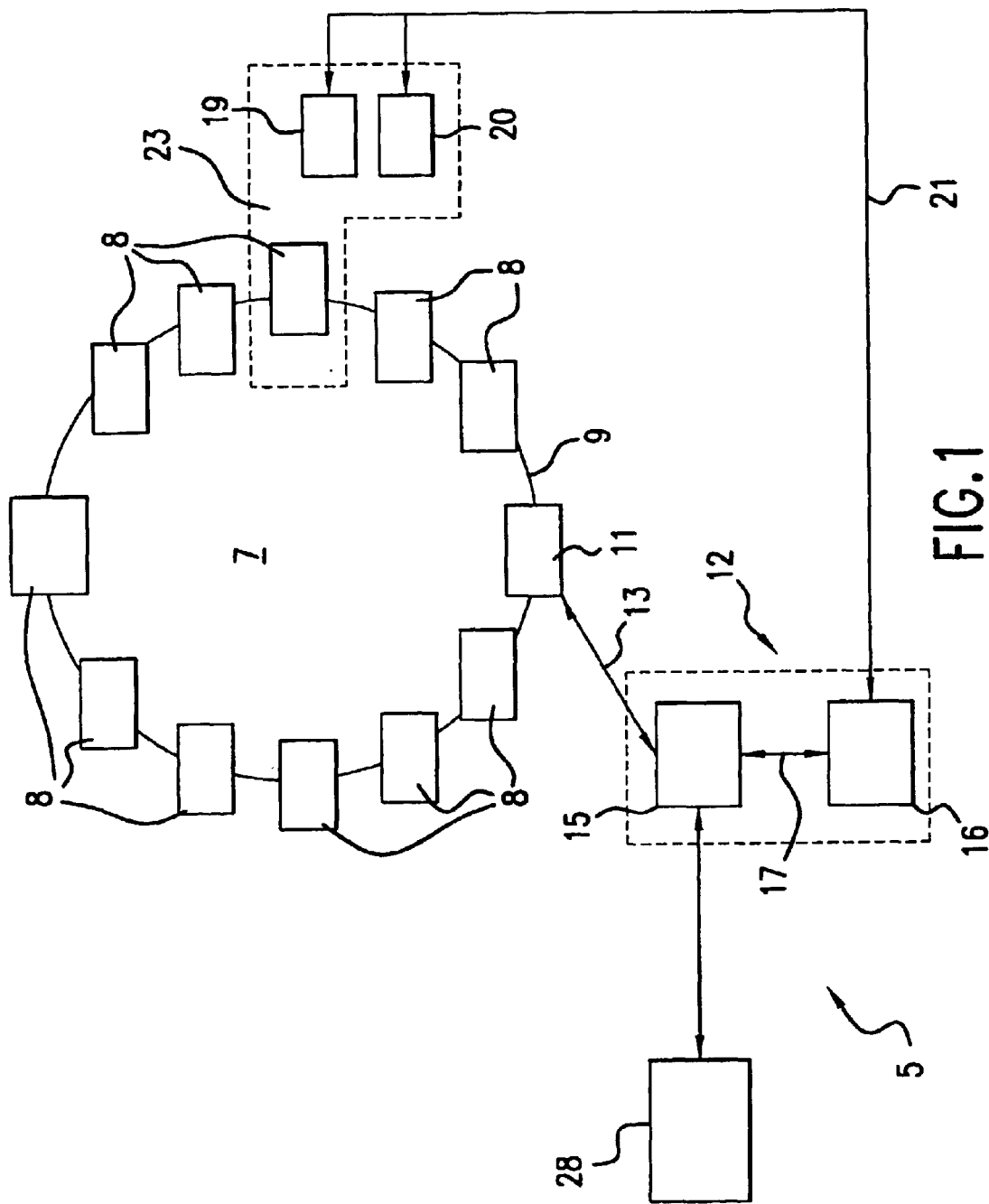

SYSTEM AND METHOD FOR SELLING LOTTERY GAME TICKETS

FIELD OF THE INVENTION

The application relates in general to methods and systems adapted for use in selling lottery game tickets. More particularly, the present invention relates to a method and system for selling either pre-printed or on-line lottery game tickets, or a combination of pre-printed and on-line lottery game tickets, through at least one point of sale terminal of a retail store.

BACKGROUND OF THE INVENTION

Lottery games have become very popular, and have proven to be a successful means by which the public authorities sponsoring these games have been able to generate revenues for use in the public good. In a first type of lottery game known as a pre-printed or "instant win" lottery game, a lottery game player purchases individual game tickets of the type disclosed in U.S. Pat. Nos. 5,451,052, and 5,560,610, respectively, issued to Behm et al., for play. Each game ticket is pre-printed by an authorized lottery game ticket manufacturer, and typically offers a cash game prize of a predetermined amount, the prize amount being covered by a rub or scratch off coating printed or laminated onto the pre-printed surface of the lottery game ticket. Once the game player scratches off the coating, and if the prize amounts match as required by the rules of the game, the lottery game player will win the prize amount printed on the ticket.

A second type of popular lottery game is an on-line game, more commonly thought of as a "lotto" type game, which requires that a game player fill out a game play ticket with a series of lottery play numbers thereon, and/or designate a "quick pick" in which either a lottery terminal or an off-site lottery system computer generates the lottery play numbers. The lottery play slip is scanned into a lottery terminal, typically a stand-alone terminal found in a convenience store, whereupon a ticket is authorized by the lottery system and printed at the lottery terminal. The on-line games are the types of lottery game conducted on a weekly statewide basis by the several states, as are the regional lottery games such as the Power Ball and Big Game lotteries played in the United States. Similar national and regional games exist in foreign nations as well.

As well known to lottery authorities and lottery game players, both the pre-printed and on-line lottery games are typically purchased at a retail or convenience type of store provided with the requisite lottery terminal for on-line games, and a display case comprising either a series of bins or plastic holding racks for holding and displaying a supply of pre-printed game tickets. When a game player desires to play a pre-printed game, for example, the sales clerk is required to manually withdraw the requested number of tickets from the ticket storage bin, separate the tickets being sold from the remaining tickets in the ticket pack or book, and tender the tickets to the game player.

In the effort to promote the popularity of lottery games and thus improve lottery generated revenues, the respective lottery authorities have been looking for ways to expand at least the reach of the on-line lottery games beyond the single POS terminal retail or convenience stores into multi-lane retail operations provided with a POS terminal at each checkout lane, for example grocery stores and the like. One approach to this problem is disclosed in U.S. Pat. No. 5,216,595 to Protheroe. Protheroe teaches a system that combines the POS terminals of a store with an on-line lottery system by placing a lottery terminal at each of the selected POS terminals of the store, each of which is equipped with a bar code reader or scanning device. Each separate lottery terminal communicates with at least one in-store lottery controller, there being a plurality of such lottery controllers illustrated in the system of Protheroe. The lottery controllers communicate with a "back office" or off-site lottery system that authorizes and records the sale of all on-line lottery game tickets.

The system of Protheroe, however, is disadvantageous in that provides a relatively invasive and complicated system which positions a lottery terminal at, and requires the integration of the lottery terminal with, the store's POS terminals. Protheroe places a lottery terminal at each POS terminal due to the fact that the method employed by Protheroe includes the steps of first passing the scanned product codes from the POS terminal bar code scanner through the lottery terminal and then the POS terminal, or of first passing the scanned product codes through the POS terminal and then to the lottery terminal, before otherwise passing the scanned codes on to the in-store POS system controller. So constructed, the lottery system of Protheroe does not appear to provide a universal approach to readily adapting on-line lottery game ticket sales through existing multi-lane POS terminal operations without extensive modifications to the POS system, and fails to address the sale of pre-printed lottery game tickets entirely.

U.S. Pat. No. 5,239,165 to Novak discloses a bar code lottery ticket handling system that provides a free standing lottery "pick stand" separate and apart from the POS system, but which pick stand is otherwise networked to a separate lottery device provided at each POS terminal. The use of the pick stand requires the store's customers to stop shopping, go to the pick stand, select the numbers they wish to play or indicate that they wish to have a quick-pick series of play numbers generated for them, print a dummy lottery game ticket at the pick stand, and then take the dummy ticket to a POS terminal for being scanned into the POS system.

Once the dummy ticket is scanned into the POS system, the lottery device at the POS terminal will detect the appropriate lottery game code, and will then communicate with either the pick stand and/or an off-site lottery system to authorize the ticket, and then print the ticket at the POS terminal. The system of Novak, however, requires once again that a "lottery device" be positioned at each POS terminal, and that the lottery device be positioned between the bar code scanner and the POS terminal. So constructed, the system of Novak is invasive in that the lottery system must be integrated into each POS terminal as Novak requires a separate lottery device/terminal at each POS terminal, and an in-store pick stand networked with each of the lottery devices. Such a lottery game system may thus be somewhat costly to construct for the many types of POS systems that are available and in use, does not appear to be capable of being easily retrofitable to existing multi-lane retail store operations, and does not address the sale of pre-printed lottery game tickets.

The patent to Blumberg et al., U.S. Pat. No. 5,588,649, teaches a promotional gaming method for use as a part of a promotional game system in retail stores. In Blumberg et al. a game token is given to store patrons within the store, or provided as a part of a product package. A bar code reader at the POS terminal scans the token and a code is read therefrom. A promotional game program stored within the store's POS system then determines if the code from the token corresponds with a stored "winning" code number, and then randomly determines a prize to be awarded to the store customer. As such, Blumberg et al. teach an in-store merchandising tie-in and promotional system rather than any form of a lottery system.

U.S. Pat. No. 6,119,099 to Walker et al. discloses an "up-sell" lottery game that can be conducted through the POS terminals of a multi-lane store. The '099 patent employs a lottery program stored within the POS operating system of a store in which the program prompts a sales clerk at a POS terminal to ask a customer if they wish to play a lottery type game for the change they are due after having received the customer's payment for the products already purchased. The '099 patent envisions using the customer's change as an up-sell, with the up-sell lottery monies going into a common storewide lottery jackpot. The lottery program determines who among the store's customers will be a winner. As such, Walker et al. do not teach a state-wide on-line lottery system and gaming method.

The need still remains, therefore, for an efficient lottery gaming system and method adapted for ready use in retail stores, to include a multi-lane store such as a grocery store, for example. Currently, grocery stores are not among the most common distribution channels for lottery game tickets for the reasons that counter space is typically scarce, ticket dispensing and/or ticket printing will interrupt the regular flow of consumer traffic through the POS terminal, and the on-line systems described above represent a costly and complicated means of making only on-line lottery games available within a multi-lane retail store environment. Additionally, at least with regard to pre-printed lottery game ticket sales, the variety of available pre-printed tickets and the time needed to handle the tickets in a sales transaction will require an undue amount of the cashier's time, and also poses a much greater opportunity for cashier error in trying to dispense lottery game tickets and collect the sales price therefor in addition to scanning and collecting the price of the groceries and other items purchased by the store customer.

Accordingly, the need remains for an efficient on-line and pre-printed lottery game system and sales method which removes the barriers to selling in retail store environments, either a single lane or a multi-lane store, and yet which allows pre-printed lottery game tickets and other lottery products to be readily made available to consumers, and which will be minimally intrusive when used with existing POS systems. Additionally, there is a need for an on-line and pre-printed lottery game system and sales method which need not be integrated into the individual POS terminals of a store's POS system, which will not require undue amounts of store labor to safely and efficiently handle and dispense the lottery products, and which will also lower the cost of handling, stocking, and replenishing both on-line and pre-printed lottery supplies and tickets, respectively.

SUMMARY OF THE INVENTION

The system and method of the present invention integrates the retail functions of modern point of sale systems, and all of the underlying infrastructure thereof, with the functionality of a heretofore unknown pre-printed lottery game ticket dispensing system and sales method for use in a retail store environment, be it either a single lane or a multi-lane store. In addition, the present invention provides an improved on-line lottery gaming system and sales method that overcomes the design deficiencies of the known on-line lottery systems developed for use in multi-lane store environments.

The present invention also provides an improved lottery gaming system and method for selling both pre-printed lottery game tickets and on-line lottery game tickets through at least one POS terminal of a retail store. In yet another embodiment, the invention provides for the dispensing of items of monetary value, which may include either dispensing pre-printed items, or printing items, of monetary value through at least one POS terminal of the POS system of a retail store.

In a first embodiment, therefore, the present invention comprises a system and method of selling and dispensing pre-printed lottery game tickets for purchase by a lottery game player within a store. In known fashion, the store will have a networked POS system with at least one, and perhaps a plurality of POS terminals located one each at the checkout lanes of the store. Each POS terminal will have a bar code reader adapted to scan product identification codes thereat. At least one pre-printed lottery game token, and preferably a plurality of lottery game tokens, will be provided for display within the store. Each lottery game token has a predetermined lottery game identification code printed thereon and associated with a particular and predetermined type of pre-printed lottery game. A game player traveling through the store while shopping will pick up at least one lottery game token, if not a plurality of tokens, and take the token with them to the POS terminal where the token is presented to a sales clerk for being scanned thereat with the other items being purchased.

A POS monitor in passive communication with the POS terminal, through the in-store POS system, will detect the scanned game identification code. The POS monitor will in turn determine from the game identification code the type of pre-printed lottery game ticket to be played, and will communicate this information to a ticket dispenser controller. The ticket dispenser controller will in turn send a dispense ticket command to a ticket dispenser located at the POS terminal such that the desired number and type of pre-printed lottery game tickets are dispensed therefrom. The functionality of the ticket dispenser controller may be combined with the POS monitor into a single device, for example a computer, as desired.

The method also includes the steps of the POS monitor determining the type of pre-printed lottery game ticket to be dispensed by looking up this data on a stored database of lottery games, and the ticket dispenser controller identifying the ticket dispenser located at the POS terminal by looking up this information on a stored database of ticket dispensers located within the retail store. The POS terminal will look up on a price book or database stored within an in-store POS system controller, and containing the identification codes of the lottery games available through the store, the price of the lottery games being purchased and played. The POS monitor will detect the amount to be charged for the lottery tickets as it is signaled by the in-store POS system controller back through the POS system to the POS terminal, and will record, and then log, respectively the lottery game ticket sales transaction.

Both of the pre-printed and on-line lottery game sales methods of this invention can be played by a lottery game player taking selected ones of the plurality of lottery game tokens, the tokens corresponding to the type and number of lottery games to be played, from within the store to the POS terminal, and presenting the selected lottery game tokens to the sales clerk for being scanned thereat. However, the lottery game player may also verbally instruct the sales clerk to change, for example increase, the desired number or type of lottery game tickets to be purchased, the sales clerk manually entering this information into the POS terminal.

In a second embodiment, the invention provides a method and system of selling an on-line lottery game ticket to a lottery game player within a store, the store having a networked POS system with at least one POS terminal equipped with a bar code reader adapted to scan product identification codes thereat. The method includes the steps of providing at least one, and preferably a plurality, of pre-printed lottery game tokens within the store, each game token bearing a predetermined lottery game identification code printed thereon for a predetermined type of on-line lottery game. The lottery game player selects and presents at least one token to the sales clerk at a POS terminal of the system, at which the token is scanned.

The scanned identification code will be detected by a POS monitor in communication with the POS terminal through the POS system, and in turn a random series of lottery play numbers will be generated for game play. The POS monitor will forward the lottery play numbers so generated to a ticket printer controller, the ticket printer controller instructing a ticket printer at the POS terminal to print at least one lottery game ticket bearing the selected lottery play numbers thereon. The functionality of the ticket printer controller may be combined with the POS monitor into a single device, for example a computer, as desired.

In a third embodiment of this invention a novel lottery game ticket sales system and method of selling both pre-printed and on-line lottery game tickets is provided for use in a retail store having the above-described POS system and at least one POS terminal. The system and method of this embodiment permit both pre-printed and on-line lottery game tickets to be purchased by a lottery game player within a retail store. Accordingly, at least one lottery game token, and preferably a plurality of pre-printed lottery game tokens, will be distributed throughout the store. Each lottery game token will have a predetermined game identification code printed thereon for a predetermined type of lottery game, either a pre-printed lottery game or an on-line lottery game.

The game player will take at least one token from within the store to a POS terminal where the token is scanned. A POS monitor in communication with the at least one POS terminal will detect the scanned game identification code from the token, and will determine therefrom the type of game to be played, either an on-line or a pre-printed lottery game. If an on-line lottery game is to be played, a series of random lottery play numbers will be generated and this information will be forwarded to a lottery game ticket printer located at the POS terminal, and at least one lottery ticket bearing the game play numbers thereon will be printed. If the lottery game to be played is a pre-printed lottery game, a dispense ticket command is sent to a lottery game ticket dispenser located at the POS terminal, whereupon the ticket dispenser will dispense the desired number and type of pre-printed lottery game tickets therefrom.

In a fourth embodiment of the invention, a method and system of selling and dispensing items having monetary value in a store, for example postage stamps, telephone calling cards, gift certificates, debit cards, money orders, and the like, is disclosed. The method includes the steps of providing at least one token, and preferably a plurality of tokens for each of several different types of items of monetary value, throughout the store. Each token bears a predetermined product identification code printed thereon for the item of monetary value to be purchased, which code may also denote the monetary value of the item to be purchased.

While shopping, the customer will select the tokens for the items of monetary value they wish to purchase and present the tokens to a sales clerk at the POS terminal for being scanned. The scanned item or product identification codes are detected by a POS monitor and the type of item to be dispensed or printed, respectively, is then determined. Thereafter, an instruction is issued to either an item dispenser to dispense the item selected for purchase if the item is pre-printed, or to an item printer to print any items which are to be printed, for example money orders, gift certificates, and the like. The POS terminal will look up the sales price of the items being sold through the POS system controller, and the POS monitor will detect the amount to be charged for the items so sold as the pricing information is communicated back to the POS terminal through the POS system.

The system may include a dispenser controller and/or a printer controller provided separately, each of which will be a separate computer, or the POS monitor may include the functionality of the dispenser controller and/or printer controller, respectively, in a single computer. The POS monitor will determine the type as well as the value of the items to be dispensed or printed, respectively, from the scanned identification codes against a stored look-up table or a database of the items available for sale through the system.

It is to these objects, as well as the other objects, features, and advantages of the present invention, which will become apparent upon reading the specification when taken in conjunction with the accompanying drawings, to which the invention is directed.

BRIEF DESCRIPTIONS OF THE DRAWINGS

FIG. 1 is a block diagram of the system of the present invention adapted for use with the POS system of a retail store.

DETAILED DESCRIPTION OF THE INVENTION

Figure 2B:
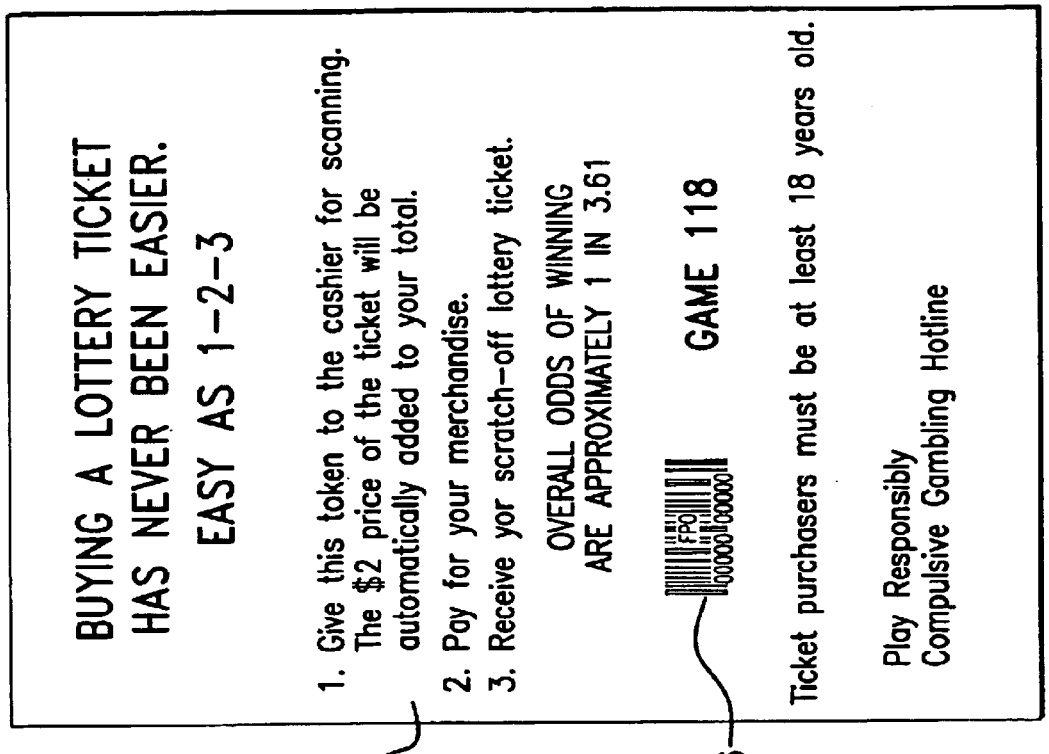
FIG. 2B is a rear view of the pre-printed lottery game token of FIG. 2A, also bearing the pre-printed lottery game identification code printed thereon.

Referring now in detail to the drawings, in which like reference characters indicate like parts throughout the several views, FIG. 1 illustrates a lottery game system 5 adapted for selling and dispensing pre-printed lottery game tickets, or for selling and printing on-line lottery game tickets, or for dispensing pre-printed lottery game tickets and also printing on-line lottery game tickets, respectively. The lottery game system is shown in use with a conventional point of sale ("POS") system 7 having a plurality of POS terminals 8 networked to one another through a POS network 9 in a retail store environment. The retail store may comprise any type of retail store operation, and may be provided with only a single POS terminal, or may comprise a "multi-lane" store, for example a grocery store, having a plurality of checkout lanes each having a POS terminal thereat The POS terminals are of the known types, and may comprise those POS terminals manufactured by IBM, NCR, Fujitsu, and/or Datachecker, respectively, as well as any of the other several types of POS terminals that now exist or may be developed in the future, and which are equipped with a bar code reader or scanner of known type.

As illustrated in FIG. 1, a plurality of POS terminals are provided, each of which is positioned at a separate check-out lane within the store. The POS network includes a POS system controller 11 of known type and construction, typically a computer provided with the requisite software and stored data, in communication with each of the POS terminals through the POS network. As known, the POS system controller is provided with a stored database or a "price book" containing the identification codes of the items offered for sale in the store, as well as the prices of those respective items.

Rather than providing a lottery terminal at each POS terminal, the system of this invention provides a single lottery system controller 12 networked with only the POS system controller through a network connection 13. The lottery system controller 12, and more particularly the POS monitor 15 thereof, interfaces with the POS system controller in accordance with the type of store POS system in use. For example, if the POS system, and more particularly the POS system controller, uses the POS control system developed and marketed by Catalina Marketing Corporation, or its predecessor Catalina Electronic Clearing Services, for example, then the lottery system controller and the POS monitor will interface with the POS controller through a Catalina Electronic Clearing Services interface, as known. The network connection 13 between the lottery system controller and the POS system controller may be any one of the known types of data communication networks, which may therefore include an Ethernet, RS 485, RS 232, token ring, USB, HDLC, and/or wireless network, among others.

The lottery system controller, to include the POS monitor 15 thereof, is connected to the store's POS system in much the same way that a POS terminal is networked to the POS system controller with the exception, however, that the lottery system controller is passive, only listening to the traffic on the POS network, and does not otherwise transmit data back to the POS system and/or the POS terminals during or at the completion of a lottery ticket sales transaction. Accordingly, during the lottery game ticket sales transaction the POS terminal at which the lottery game ticket sale takes place will read a lottery game identification code scanned into the bar code reader of the POS terminal from a pre-printed lottery game token, as described in greater detail below. In response to the scanning of the lottery game identification code(s), the POS terminal will look up the price of the lottery game ticket(s) through the price book or look up database stored within the store's POS system controller so that the customer may be charged the correct price for the lottery game tickets so purchased. As the POS monitor is passively "listening" to all of the POS network traffic passing through the POS network or system, the POS monitor will detect the lottery game identification code as it is passed into the POS network by the POS terminal at which the token was scanned, and will then detect the sales price of, i.e., the amount to be charged for, the lottery games tickets being sold at the POS terminal as the pricing data therefor is communicated by the POS system controller back to the POS terminal.

Still referring to FIG. 1, the lottery system controller includes the POS monitor, as shown, as well as a separate ticket dispenser/printer controller 16, networked to the POS monitor through a separate network 17, for example, an Ethernet network, although any suitable type of network may be used. Although a separate POS monitor and ticket dispenser/printer controller (hereinafter the "ticket controller") are shown, the functionality of the ticket controller can reside within the POS monitor such that the POS monitor and the ticket controller comprise a single device, for example a computer, to include an NT workstation or any other suitable type of stand-alone computer, and adapted to implement the control processes of FIGS. 3–8.

The lottery game system includes a pre-printed ticket dispenser 19, and a separate on-line lottery game ticket printer 20, each of which is stationed at at least one of the POS terminals 8 comprising the store's POS system. The ticket dispenser and ticket printer are each networked to the ticket controller through a separate network connection 21, which may be any of the known types of networks and may include, for example, a wireless network thus minimizing the amount of wiring needed to install the lottery game system within a currently existing retail store environment while also allowing the expeditious installation of the lottery game system to the store's POS system.

The POS terminal and its associated ticket dispenser and ticket printer together comprises a POS station 23, manned by a sales clerk. The ticket dispenser may comprise, for example and not by way of limitation, those automated lottery game ticket dispensers manufactured by On-Point Technology Systems, Inc., and more particularly the CounterPoint 4-bin and 8-bin dispensers manufactured thereby and equipped with a suitable controller interface adapted for communication with the lottery system controller 12, to include the POS monitor 15 and/or the ticket controller 16 thereof.

The lottery system controller will be adapted for communication with an off-site lottery computer 28 (FIG. 1) through any of the known types of communication methods, networks, and devices, which may include dedicated network access or dial-up access, and that will allow the periodic or "live" instantaneous exchange of data between the lottery system controller and the lottery computer for at least the purposes of recording and authorizing on-line lottery game ticket sales prior to being printed by the ticket printer in much the same fashion as the lottery computer currently communicates with the known types of stand-alone lottery terminals used in convenience stores, for example.

Figure 2A:
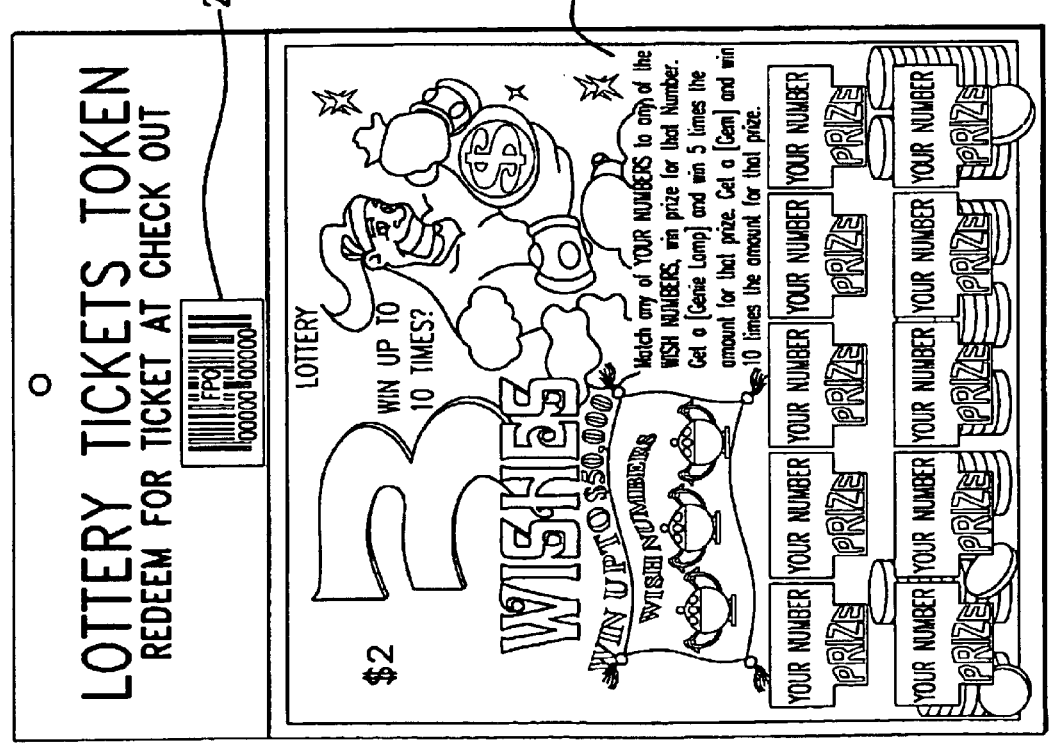
FIG. 2A is a front view of a pre-printed lottery game token, bearing a product game identification code printed thereon.

A pre-printed lottery game token 25 is illustrated in FIGS. 2A and 2B. The lottery game token includes a lottery game identification code 26 on either the front or rear, and/or both of the front and rear faces of the token, respectively, and as desired. Although the lottery game identification code is shown on both the front and the rear faces of the lottery game token in FIGS. 2A and 2B, all that is required is the lottery identification code appear in at least one location, on either the front or rear face of the lottery game token. The lottery game token shown in FIGS. 2A and 2B resembles a pre-printed or instant win type of lottery game ticket, and has on its rear face (FIG. 2B) a game identifier 27, here a game number, which will associate this token with a specific type of pre-printed lottery game. Although not specifically illustrated, it is intended that a similarly configured pre-printed lottery game token will be provided for each type of pre-printed lottery game offered for sale at the store, each token having separate art and graphics thereon if so desired.

A lottery game token of the type described above will also be made available for each type of on-line lottery game that may be offered for sale in the store. Accordingly, each lottery game token will have a separate game identification code printed thereon and specific to the type of game to be played, whether a pre-printed or on-line lottery game, with the token.

Although the lottery game token 25 of FIG. 2A is printed to resemble an instant win game ticket, it does not contain the necessary laminated or scratch off layers such that it can be played as a game ticket. In all of the embodiments of this invention, the lottery game token is a pre-printed "dummy" token having no ability to serve as a valid lottery game ticket in any fashion. At least one type of lottery game token, one for each type of lottery game to be played thereby, and preferably a plurality of several differing types of lottery game tokens will be distributed in at least one and preferably a plurality of locations throughout the store so that the tokens can attract the eye of the consumer, and so that the store's customers may readily identify the type of lottery game they wish to play by the appearance or design of the token. So provided, the game tokens may be selected with great ease and speed, without requiring the shopper to otherwise stop and select game play numbers for an on-line lottery game, for example.

The lottery game identification code 26 on each lottery game ticket token distributed throughout the store will be for a unique, i.e., a specific and predetermined, type of lottery game, be it either a pre-printed lottery game or an on-line lottery game. Accordingly, there is no need for a separate ticket stand or pick stand at which a game player will enter their lottery game numbers for on-line lotteries. Rather they game player will pick the token associated with the game they wish to play and take the token with them as they continue with their shopping with minimal interruption.

Figure 3:
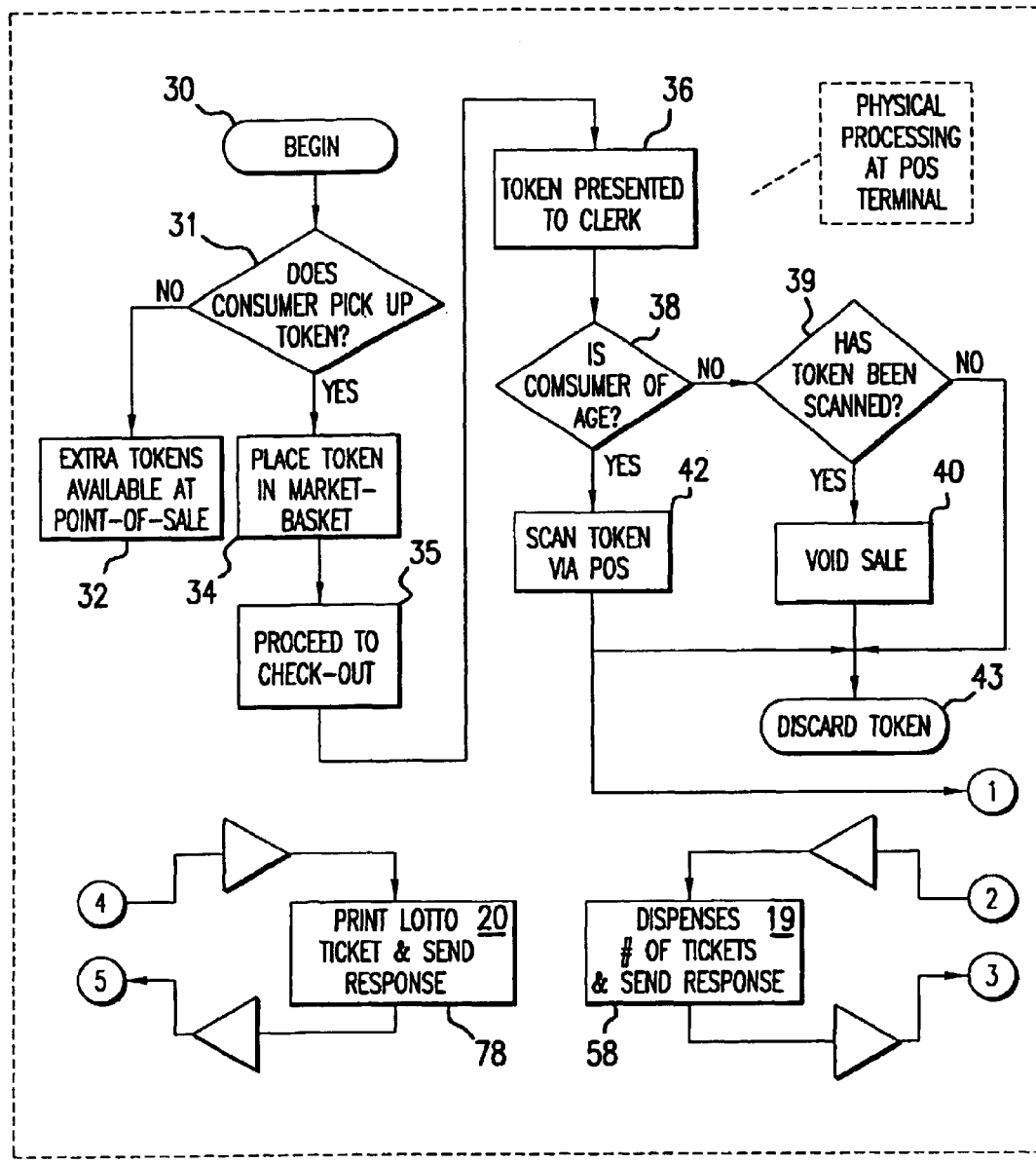
FIGS. 3–5 are a process flowcharts of the method of dispensing pre-printed lottery game tickets and/or printing on-line lottery game tickets of the invention.

Referring now to FIGS. 3 through 6B, a method of selling and dispensing pre-printed lottery game tickets, or of selling and printing on-line lottery game tickets, or of selling both pre-printed and on-line lottery game tickets is illustrated. Referring first to FIG. 3, which represents the physical actions that take place within the store, the process begins at step 30 with the consumer and potential lottery game player shopping within the store. As the game player shops, they may either pick up a token as indicated in step 31, or may select a token displayed and made available at the point of sale terminal as indicated in step 32. If the game player has selected a token while shopping, that token is carried by the game player, for example by pacing it in their shopping basket as shown in step 34, and the game player completes their shopping and ultimately proceeds in step 35 to check out at one of the store's POS terminals.

The lottery game player presents the lottery game token to a sales clerk at the POS terminal in step 36. Thereafter, as shown in decision block 38, the sales clerk will determine whether the consumer is of legal age to play the desired lottery game, and if not determines in step 39 if the token has been scanned. If the lottery game token has already been scanned and the lottery player is not of age, the sale is voided at step 40 and the token is discarded at step 43. If the token has not been scanned, then the process proceeds directly to step 43, where the lottery game token is discarded.

When the game player takes the lottery game token to the POS terminal, it is possible that the game player may want multiple numbers of the pre-printed lottery game ticket requested by the token, or may want to play an on-line lottery game a multiple number of times, respectively. In these instances, the lottery game player need only verbally instruct the sales clerk to increase either the number of pre-printed lottery game tickets to be dispensed, or the number of times they wish to play the on-line lottery game such that the appropriate number of on-line lottery play numbers are generated and printed on the appropriate ticket or tickets.

It is also anticipated that game players may verbally request that a pre-printed lottery game ticket be dispensed or an on-line lottery game ticket be printed at the POS terminal without having a lottery game ticket token in hand. The POS terminal will be programmed to manually request that a pre-printed lottery game ticket be dispensed, or that an on-line lottery game ticket be printed, respectively, without a lottery game token. This may be accomplished by having certain POS terminal keys, or key combinations, programmed such that when the sales clerk punches a certain POS terminal key or key combination that a request for a lottery game ticket will be initiated by the POS terminal emitting the appropriate lottery game identification code which will then be sensed or detected by the lottery system controller/POS monitor, and the appropriate lottery game ticket dispensing or printing procedure will be initiated.

Figure 4:
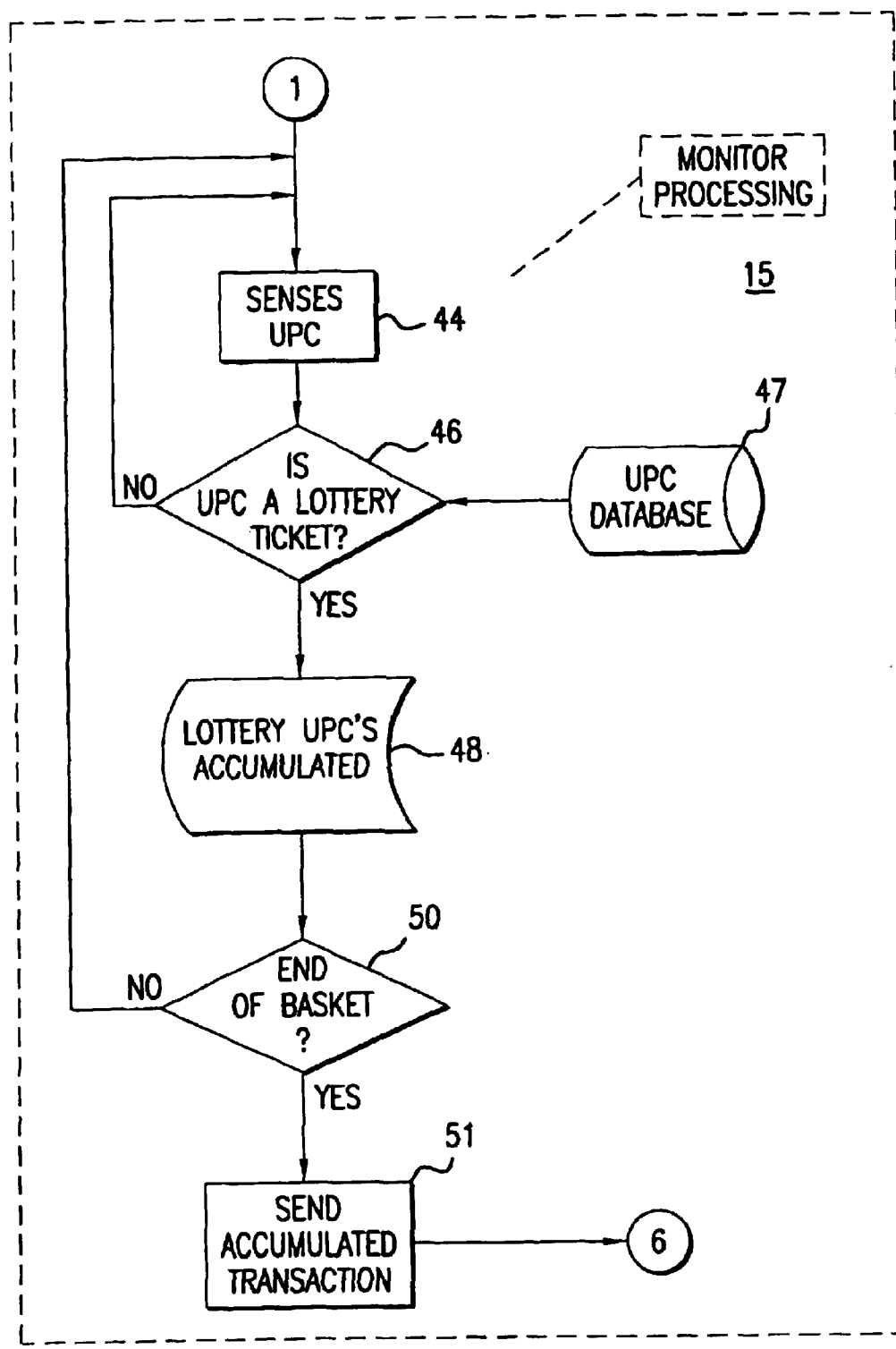

Still referring to FIG. 3, if the consumer is of age in step 38 and the token has not yet been scanned, the token will be scanned in step 42 by passing it over at least one bar code reader, of any known type thereof, provided as a part of the POS terminal. Once scanned, the data passes through the POS terminal 8 into the POS network 9 (FIG. 1), and from there into the POS system controller 11. Referring now to FIG. 4, which represents those actions taking place within the POS monitor 15 (FIG. 1), the POS monitor, through its network connection 13 with the POS system controller, is passively monitoring or "listening in" at step 44 on all of the network traffic passing through the POS system. The POS monitor reads or detects all of the scanned product and/or lottery game identification codes entered into the POS network through the scanners of the respective system POS terminals.

As known the product identification codes for the items offered for sale within the store may comprise a universal product identification code ("UPC"), as may be, and preferably are, the lottery game identification codes. If a sensed UPC belongs to a lottery game as determined in step 46, the POS monitor will compare the game identification code to a game identification code database in step 47 for determining the type of lottery game to be played. The POS terminal obtains the sales cost of the lottery game tickets being purchased from the store's "price book" stored within the POS system controller, which sales cost is detected by the POS monitor as this information is passed by the POS system controller back to the POS terminal through the POS network, the POS monitor recording this in step 60, and logging the transaction in step 62, as described below.

Figure 9:
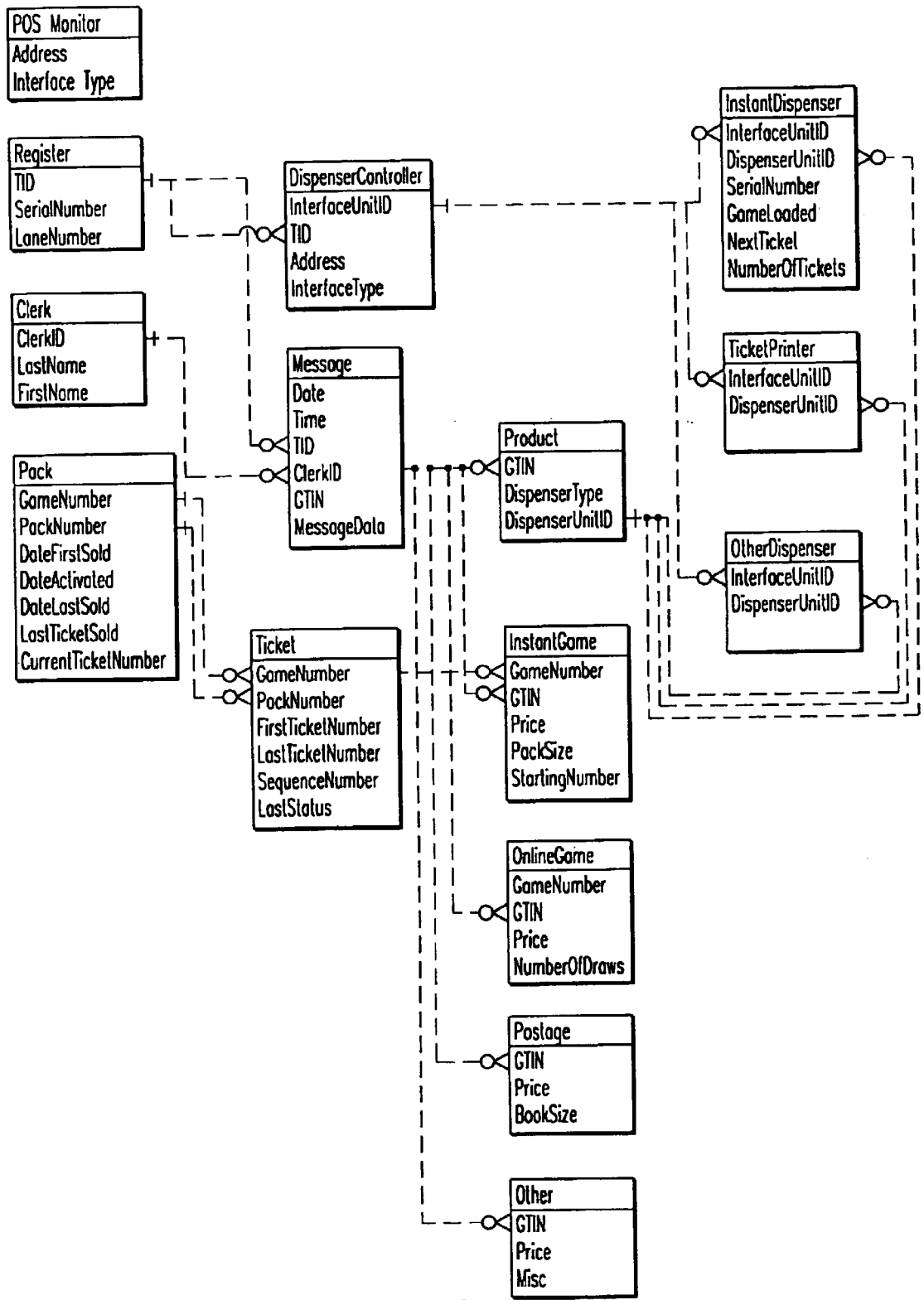
FIG. 9 is a schematic illustration of the look-up table or database stored within the lottery system controller of the invention.

FIG. 9 schematically illustrates a look up table or database stored within the POS monitor/lottery system controller, and illustrates those pre-programmed criteria being determined through the lottery game system and the scanned lottery game identification code or codes. This will include the location and identity of the POS terminal at which the game identification code has been scanned, the identity of the sales clerk thereat, and will identify the type of pre-printed and/or on-line lottery game to be played. If a pre-printed lottery game is to be played, the POS monitor and/or the ticket controller identifies the ticket dispenser 19 (FIG. 1) at the POS terminal, and will poll the ticket dispenser to determine if the desired number and type of pre-printed lottery game tickets are available to be dispensed and sold therefrom.

Referring to FIG. 4, if the UPC that has been scanned and sensed in step 44 is not a lottery ticket, then the process loops back on itself to step 44 until such time as it detects a lottery game identification code, whereupon the POS monitor will look up in step 47 the type of lottery game to be played from the above-described lottery game database. Assuming that a lottery game is to be played and has been properly identified through the look-up table/database, the POS monitor accumulates all of the lottery game identification codes, and once the end of the shopping basket is reached, i.e., the items being scanned at the POS terminal have been completed and a subtotal has been requested, the POS monitor will send the accumulated game identification codes to the ticket controller, as reflected in FIG. 5. As discussed hereinabove, it is anticipated that the process steps implemented by the ticket controller 16 may instead be undertaken by the POS monitor performing the functions of both the POS monitor and ticket controller.

Figure 5:
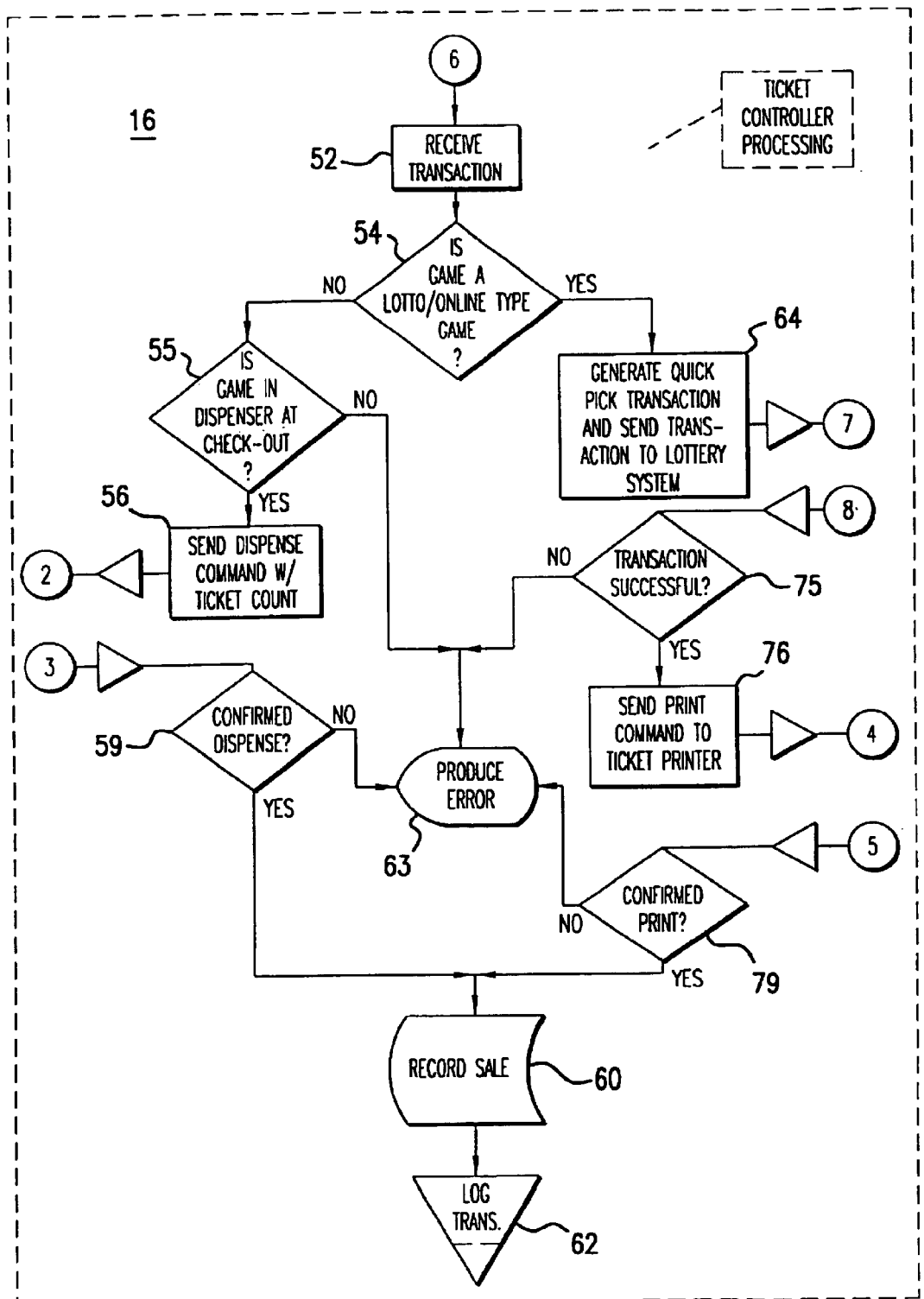

Referring now to FIG. 5, the accumulated game identification codes have been forwarded to and received by the ticket controller 16 (FIG. 1) in step 52. The ticket controller determines if the lottery game or games being played are an on-line or a pre-printed lottery game. If the game identification code is for a pre-printed lottery game, then the process moves to step 55 whereupon the ticket controller will poll the identified ticket dispenser at the POS terminal to determine if the desired lottery game ticket is in stock. If so, the process will proceed to step 56, whereupon a dispense ticket command will be sent to the ticket dispenser, as illustrated in FIG. 3. Once the dispense ticket command has been given, and the desired number and type of pre-printed lottery tickets have been dispensed, the dispensing of the tickets is confirmed in step 59. Once confirmed, the process proceeds to step 60 to record the sale within the POS monitor, in which the sales cost of the lottery game tickets detected by the POS monitor as this data is transmitted by the POS system controller back to the POS terminal is recorded, and the POS monitor then logs the transaction in step 62. If, at step 55, the ticket controller determined that the desired number and/or type of pre-printed lottery game tickets were not available in the ticket dispenser, an error message will be produced in step 63, and the lottery transaction will be concluded.

Figure 6A:
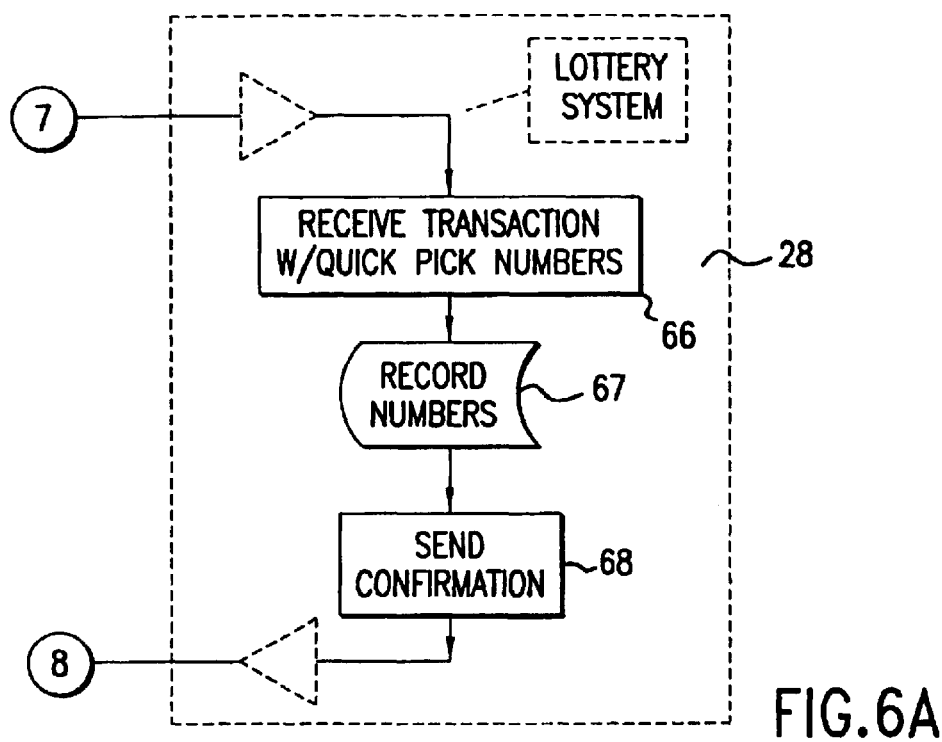
FIG. 6A is a flowchart of a first subroutine than may be practiced by the process of this invention.
Figure 6B:
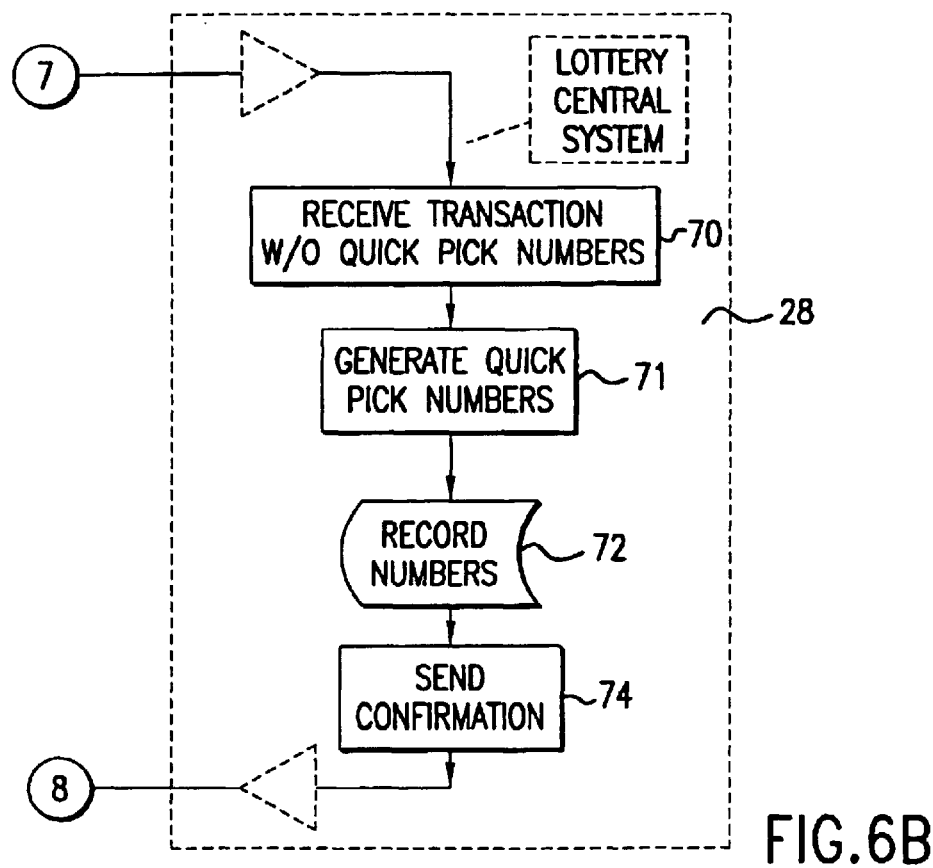
FIG. 6B is a flowchart of a second alternate subroutine that may be practiced by the process of this invention.

Returning now again to step 54, if an on-line lottery game is to be played, the process proceeds to step 64 which generates a quick-pick transaction and sends the transaction data or request to the off-site lottery computer 28 (FIG. 1) performing one of the two separate subroutines illustrated in FIGS. 6A and 6B. The type of on-line lottery game described for use with the system of this invention is a "quick-pick" game in which the lottery game player does not select the numbers they wish to play, instead the lottery system or lottery computer will generate a series of random lottery game play numbers for the game player, and forward the lottery play numbers to the ticket printer located at the POS terminal. The use of the quick-pick ticket is well known to those of skill in the art, and to lottery game players, and the manner in which the quick-pick numbers are generated is a detail of the particular lottery system in use. Certain lottery systems generate the quick-pick numbers at the lottery terminal and forward these numbers to an off-site lottery computer, whereas other types of lottery systems forward the quick-pick request from a lottery terminal to the lottery computer that generates the quick-pick numbers.

Referring now to FIG. 6A, therefore, where the POS monitor has generated the random numbers for the lottery quick pick(s) in step 64, using a random number generation program stored within and executed by the computer comprising the POS monitor, the quick-pick number transaction is received by the lottery computer in step 66. Thereafter, the lottery computer will record the quick-pick numbers in step 67, and send a confirmation thereof back to the in-store lottery system in step 68 so that the desired on-line lottery game ticket(s) can be printed in step 75 (FIG. 5).

If, in the alternative, the lottery computer generates the random game play numbers, then the subroutine illustrated in FIG. 6B is followed. Accordingly, in step 64 the POS monitor will generate a quick-pick request to the off-site lottery computer, which request is received in step 70. Thereafter, the lottery computer generates the quick-pick numbers in step 71, records these numbers in step 72, and then sends a confirmation/authorization thereof in step 74 back to the in-store lottery system which will permit the on-line lottery game ticket or tickets to be printed.

Referring now to FIG. 5, once the on-line lottery ticket quick-pick number generation sequence has been completed, a determination of whether a quick-pick number has been successfully generated is performed in step 75. If not, then an error message is produced in step 63 and the lottery transaction is concluded. If, however, the quick-pick number transaction has been successful, a print ticket command is sent by the ticket controller in step 76 to the ticket printer 20 (FIG. 3), such that in step 78 the desired number of on-line lottery game tickets are printed. Thereafter the process will determine in step 79 if the lottery game ticket has been printed, and if so the process proceeds to step 60 where the POS monitor records the sale of the lottery game tickets, the sales price of the lottery game tickets being detected by the POS monitor as this information is transmitted by the POS system controller back to the POS terminal, and the POS monitor logs the transaction in step 62. At the conclusion of the lottery game ticket sales transaction, the POS terminal at which the lottery transaction has been conducted will print on the customer's receipt the number and type of lottery game tickets that have been sold to the consumer.

It is anticipated that the logged sales transactions in step 62 (FIG. 5) will be periodically forwarded to the off-site lottery computer 28. This may occur by the POS monitor dialing up or accessing the lottery computer at pre-determined time intervals, or may involve the lottery computer polling the POS monitor at pre-determined time intervals. Additionally, and if so desired, the network connection between the POS monitor and the lottery computer can be a continuous or "live" two-way feed to and from the lottery computer by the POS monitor. The advantages of the system, therefore, especially with regard to the sale of pre-printed lottery game tickets, is that the system for the first time allows lottery authorities to monitor the sale of pre-printed lottery game tickets on a real-time basis. By so doing, lottery game officials will be able to determine the type and volume of pre-printed lottery game tickets being sold, which will allow the lottery authorities to order replenishment supplies of the lottery game tickets for the store on a "just in time" basis thus reducing the labor time required by store personnel to otherwise do this. In addition, by using an automated pre-printed ticket dispenser, security of the lottery system has been increased in that no longer are pre-printed lottery tickets available in loose rolls or packs which are susceptible to theft, the ticket dispenser dispensing only the requested number of tickets as a result of a specific and requested lottery pre-printed ticket sale transaction.

An additional feature of the system of this invention when used for the sale of pre-printed lottery game tickets, but which can also be used with on-line lottery ticket sales, deals with the preparation of "shift" reports for the pre-printed lottery game tickets sold during a cashier's work shift. Under current practice, at the beginning of their work shift a sales clerk will record the ticket serial number of the first or top most pre-printed game ticket available for sale in each bin of pre-printed lottery game tickets offered for sale, which bins are typically unsecured acrylic dispensers. At the end of the shift, the sales clerk will record the then current ticket serial number of the top most lottery game ticket in each bin, and then reconcile the number of lottery game tickets sold or voided during the work shift. A problem with this practice is that one or more of the tickets can be easily removed or stolen from the acrylic dispensers, or if the ticket pack was exhausted and a new ticket pack placed into the dispenser without recording the number of the last lottery game ticket of the first ticket pack and the succeeding first pre-printed lottery game ticket of the next ticket pack opened and sold during the rush of sales activity, it becomes difficult, if not at times impossible, to properly reconcile pre-printed lottery ticket sales. Moreover, in a multi-lane store, for example a grocery store, this type of labor will not be made available for the selling of pre-printed lottery game tickets as ticket sales will likely be a relatively small proportion of overall sales in the store, and thus of relatively minor importance to the store personnel and management.

By using the system and method described hereinabove, a much simpler reconciliation process results. The POS monitor will process the sales of all pre-printed lottery game tickets, as described above. Tickets will only be dispensed from a secured and automated pre-printed ticket dispenser, when and if purchased. Accordingly, the POS monitor will have a record of every lottery ticket sale that has occurred, and is thus able to provide the POS system controller with the necessary information for preparing a complete lottery shift report for the POS terminal. The shift report will include the identification of the sales clerk, the sales amount and number of lottery game tickets sold, and the time of each ticket sale if so desired. The sales clerk will print a shift report from the POS system, just as the sale clerk currently prints their shift reports now, and will also request that a shift report be printed from the lottery system controller, a printer being made available for this purpose and in communication therewith, which printer may be the POS terminal receipt printer. Thereafter, the two shift reports can be compared, and any discrepancies between the number of tickets sold and the amounts collected therefor can be readily identified.

The lottery gaming method of FIGS. 3 through 6B thus allows for the automated sale of pre-printed lottery game tickets in a retail store environment in heretofore unknown fashion. Additionally, this invention provides a simplified lottery system and lottery gaming method for selling on-line lottery game tickets through a multi-lane store environment. The described lottery game system is simple in its construction, having only a single lottery system controller which passively monitors or listens in on the network traffic between the POS terminals and the POS system controller through the POS network, and a lottery terminal or device is not required to be positioned at, and/or associated with the bar code scanner of, each POS terminal.

Another feature of this invention, therefore, is that this system may be rapidly and readily retrofit to existing POS systems in multi-lane store environments. The lottery system controller 12 is networked to the POS system controller 11 with a simple, single network connection. The lottery system controller is then networked to each lottery ticket dispenser and/or ticket printer, which preferably can be done by using a wireless network such that hard wiring of the system components need not occur, and which allows the system to be quickly installed within existing multi-lane store environments.

If desired, the lottery game system of FIG. 1 can be adapted to authorize pre-printed lottery game tickets as they are being dispensed, in effect turning a pre-printed or instant-win lottery game into an on-line lottery game for improved security purposes. Accordingly, and if desired, a bar code reader or scanner will be provided as a part of the pre-printed lottery game ticket dispenser. Each pre-printed lottery game ticket bears an encrypted validation number thereon, encoded into an i2o5 bar-code printed on the back of the ticket, which validation number uniquely identifies the game ticket. When and as a pre-printed lottery game ticket is dispensed from the ticket dispenser, therefore, the bar coded ticket validation number is scanned by the ticket dispenser bar code reader and forwarded by the ticket dispenser through its network connection to the ticket controller. The ticket controller forwards the ticket validation number to the POS monitor, which in turn forwards the validation number to the off-site lottery computer in the form of a new "Ticket Activation Message".

The lottery computer records the ticket validation number and authorizes the ticket so that the game ticket is now "live," and in play. Each ticket is therefore activated and validated only as It is dispensed from the ticket dispenser. In this manner, only those pre-printed lottery game tickets properly dispensed, i.e., scanned into the lottery system, will be valid and entitled to be cashed if a winning ticket. Any pre-printed tickets that may have been stolen, for example, will not have been scanned into the lottery system, no record of the ticket sales will exist in the lottery computer, and the tickets will not be authorized for payment if the ticket holder attempts to cash the tickets through a lottery retailer as the stolen tickets are inactive, and thus worthless.

Figure 7:
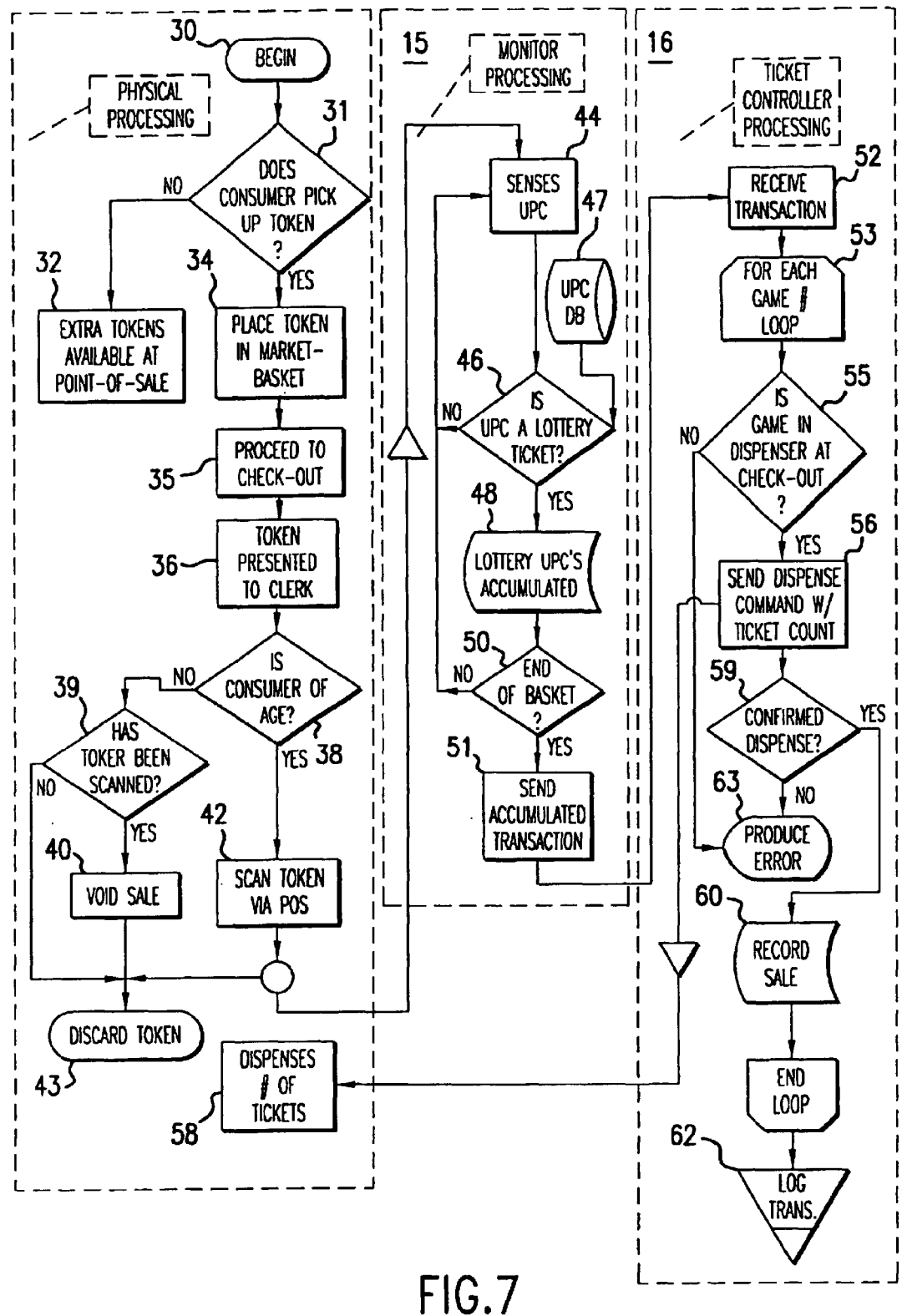
FIG. 7 is a flowchart of a method of selling and dispensing pre-printed lottery game tickets, only, of the invention.
Figure 8:
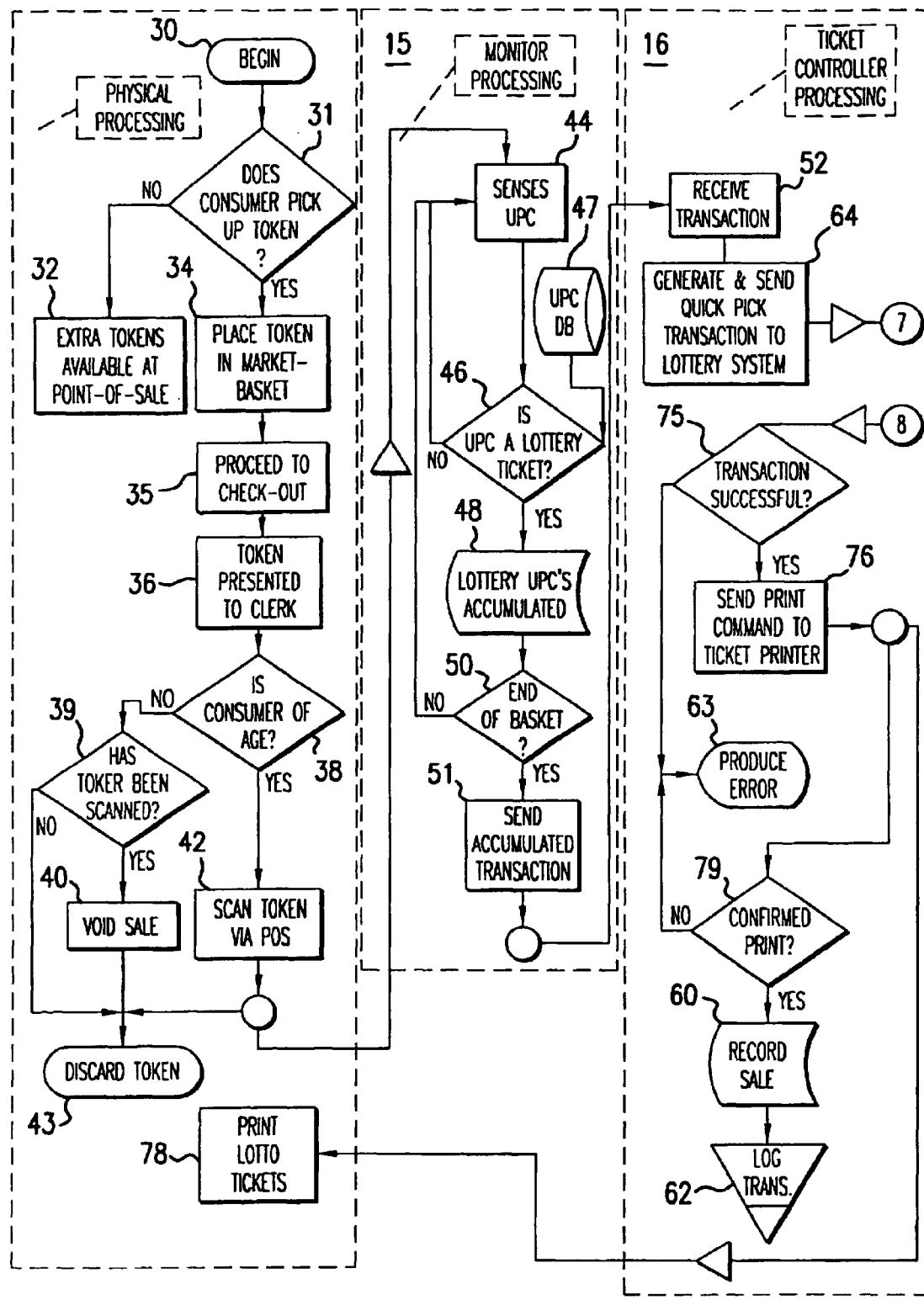
FIG. 8 is a flowchart of a method of selling and printing on-line lottery game tickets, only, of the invention.

FIG. 7 illustrates the control process described above, but for a method of selling pre-printed lottery game tickets within a store, only. As such, all of the steps illustrated in FIG. 7 are those described above for the process illustrated in FIGS. 3–6B, with the exception of step 53 in FIG. 7, which initiates a loop for each pre-printed lottery game ticket to be sold, following steps 55 through 62, as discussed hereinabove. FIG. 8 illustrates a method of selling on-line lottery game tickets, only, for example where the lottery retailer chooses not to offer pre-printed lottery game tickets in-store. The on-line ticket sales process FIG. 8 therefore follows the steps of the process of FIGS. 3–5 for selling on-line lottery game tickets in association with the applicable one of the subroutines illustrated in FIGS. 6A and 6B, respectively.

It is understood by those skilled in the art that those steps of the control process illustrated in FIGS. 3–8 implemented in the POS monitor 15 and/or the ticket controller 16 represent blocks of executable computer or machine readable program code that will be executed by the appropriate computer, either the POS monitor, the ticket controller, or the off-site lottery computer, as a part of the method and system of this invention. It is also known to those of skill in the art that the database illustrated in FIG. 9 can be programmed in any of the known types of programming codes and/or database programs, and can be stored in any suitable memory device provided as a part of the lottery system controller 12, i.e., the POS monitor 15 and/or the ticket controller 16 (FIG. 1).

Yet another embodiment of this invention is made possible by utilizing the system of FIG. 1, and the control process of FIGS. 3 through 6B for selling items of monetary value rather than lottery game tickets. Examples of items of monetary value that may be pre-printed and dispensed through a suitable item dispenser located at the POS terminal would thus include, but are not limited to, postage stamps, money orders, phone or calling cards, debit cards, credit cards, gift cards, or frequent shopper cards. Items of monetary value that can be printed by a suitable item printer located at each POS terminal would include, but are not limited to, money orders, gift certificates, and other negotiable instruments of a value to be determined by the consumer. The manner in which this is accomplished follows the process by which the above-described pre-printed and on-line lottery games may be played and sold.

Accordingly, a plurality of item tokens, pre-printed in the same fashion as the pre-printed lottery game tokens shown in FIGS. 2A and 2B, may be provided within a store. Each token will identify the type of item to be purchased, as well as a monetary value associated therewith. It is anticipated that there may also be tokens available for items to be purchased of a monetary value to be determined by the customer at the POS terminal and upon payment for the item to be purchased. The item purchaser will thus select the appropriate token or tokens as they shop and move throughout the store. No separate selection desk is needed at which the purchaser will fill out a request for a specific item, the purchaser need only take a pre-printed token having a pre-printed item identification code thereon to the POS terminal. Upon arriving at the POS terminal, the purchaser will present the item tokens to a sales clerk, where the tokens will be scanned with the bar code reader provided as a part of the POS terminal. The system used for this sales operation will be the same system as the lottery game system 5 illustrated in FIG. 1.

The POS monitor will passively listen to the POS network traffic through the POS system controller, sensing all of the product identification codes scanned through the system. When a product identification code for an item of monetary value is scanned at the POS terminal that matches an item code therefor, and which item code is stored within a look-up table or database within the POS system controller, the POS system controller will return the sales price of the items being purchased back to the POS terminal through the POS network. The POS monitor detects the scanned item identification code or codes as they pass from the POS terminal to the POS system controller, and then detects the sales price thereof as the POS system controller passes this information back to the POS terminal.

For items of a predetermined monetary value which may be in supply in an item dispenser located at the POS terminal, the POS monitor will identify from the scanned item identification code the type of item to be purchased. The POS monitor and/or a dispenser controller will then poll the item dispenser to determine if the item to be dispensed is present in the desired value, and if so, will authorize that item to be dispensed in the desired number at the POS terminal. The sales transaction/data will then be recorded within the POS monitor.

Where, for example, an item is to be purchased at the POS terminal which does not have a predetermined monetary value, the appropriate token can be given, or a verbal request made to the sales clerk, it being anticipated that the sales clerk can initiate a manual sales request through the POS terminal for the item of monetary value to be sold, the POS terminal being programmed to accomplish this task. Thereafter the desired item's identification code will be scanned by the POS terminal through its bar code reader and entered into the POS network. The POS monitor detects the scanned item identification code or codes as they pass from the POS terminal to the POS system controller, and then awaits the sales price thereof. The desired monetary amount of the item will be verbally transmitted by the purchaser to the sales clerk and entered into the system through the POS terminal, and subsequently detected by the POS monitor. Thereafter, the POS monitor communicates with an off-site authorization computer that will authorize and record the sale of the particular item associated with that authorization, for example a money order or a calling card, in the same fashion as the POS monitor communicates with the off-site lottery computer. Once the transaction is authorized, a print command is issued to the item printer at the POS terminal. The item printer will be supplied with the appropriate paper/print stock for the item to be printed and a money order is printed at the POS terminal and dispensed to the purchaser.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

We claim:

1. A method of selling and dispensing pre-printed lottery game tickets for purchase by a lottery game player within a store, the store having a networked point of sale (POS) system with at least one point of sale (POS) terminal having a bar code reader adapted to scan product identification codes of items offered for sale, said method comprising the steps of:

providing a ticket dispenser supplied with at least one type of pre-printed lottery game ticket;

the game player picking up at least one lottery game token from within the store, each lottery game token bearing a game identification code thereon identifying a single predetermined pre-printed lottery game;

the game player taking the at least one token to a point of sale (POS) terminal and scanning the at least one token thereat;

detecting the scanned game identification code with a point of sale (POS) monitor in communication with the point of sale (POS) system;

the point of sale (POS) monitor determining from the scanned game identification code the type of lottery game to be played;

the point of sale (POS) monitor communicating with a ticket dispenser controller; and the ticket dispenser controller sending a dispense ticket command to the ticket dispenser such that the desired number and type of pre-printed lottery game tickets are dispensed therefrom;

whereby a sales clerk collects payment for, and delivers the pre-printed lottery game tickets to the game player.

2. The method of claim 1, the point of sale (POS) monitor accumulating the scanned game identification codes and forwarding the accumulated game identification codes to the ticket dispenser controller.

3. The method of claim 1, the ticket dispenser controller identifying the ticket dispenser at the point of sale (POS) station, and polling the identified ticket dispenser to determine if the desired number and type of pre-printed lottery game tickets are available therein.

4. The method of claim 1, the ticket dispenser controller notifying the point of sale (POS) monitor that the pre-printed lottery game tickets have been dispensed.

5. The method of claim 1, the at least one point of sale (POS) terminal looking up through the point of sale (POS) system the amount to be charged for the pre-printed lottery game tickets so dispensed, the point of sale (POS) monitor then detecting the amount to be charged for the pre-printed lottery game tickets through the point of sale (POS) system.

6. The method of claim 1, the point of sale (POS) monitor recording the sale of each pre-printed lottery game ticket so dispensed.

7. The method of claim 1, the point of sale (POS) monitor logging the sales transaction for each pre-printed lottery game ticket that is sold.

8. The method of claim 7, further comprising the step of the point of sale (POS) monitor reporting the logged sales transactions to an off-site lottery computer.

9. The method of claim 1, further comprising the step of the point of sale (POS) monitor selectively preparing a transaction report of all of the pre-printed lottery game tickets dispensed and sold at the at least one point of sale (POS) terminal.

10. The method of claim 1, the point of sale (POS) monitor looking up the scanned game identification code on a stored lottery game database to determine which type of pre-printed lottery game to be played.

11. The method of claim 1, further comprising the step of dispensing the pre-printed lottery game tickets from a supply of pre-printed lottery same tickets stored within the ticket dispenser.

12. A method of selling pre-printed lottery game tickets for purchase by a lottery game player within a store, the store having at least one point of sale (POS) terminal having a bar code reader adapted to scan and identify product codes of items offered for sale, said method comprising the steps of:
supplying a ticket dispenser with at least one type of pre-printed lottery game ticket;
scanning at least one lottery game token at the at least one point of sale (POS) terminal, each lottery game token bearing a game identification code thereon identifying a single predetermined pre-printed lottery game;
detecting the scanned game identification code with a point of sale (POS) monitor in communication with the at least one point of sale (POS) terminal;
the point of sale (POS) monitor determining from the scanned game identification code which type of pre-printed lottery game ticket is to be dispensed; and
the point of sale (POS) monitor instructing the ticket dispenser to dispense the desired number and type of pre-printed lottery game tickets therefrom.

13. The method of claim 12, the at least one point of sale (POS) terminal looking up the amount to be charged for the pre-printed lottery game tickets so dispensed, the point of sale (POS) monitor then detecting the amount to be charged for the pre-printed lottery game tickets.

14. The method of claim 12, the point of sale (POS) monitor polling the ticket dispenser to determine if the desired number and type of pre-printed lottery game tickets are available therein.

15. The method of claim 12, the step of dispensing the pre-printed lottery game tickets comprising the step of dispensing the pre-printed lottery game tickets from a supply thereof within said ticket dispenser.

16. The method of claim 12, the point of sale (POS) monitor logging each lottery game ticket sales transaction conducted at the at least one point of sale (POS) terminal.

17. The method of claim 12, the point of sale (POS) monitor communicating with an off-site lottery computer and reporting the logged sales transactions thereto.

18. The method of claim 12, further comprising the step of the point of sale (POS) monitor selectively preparing a transaction report of all of the pre-printed lottery game tickets dispensed and sold at the at least one point of sale (POS) terminal.

19. The method of claim 12, further comprising the step of providing a plurality of said lottery game tokens at locations throughout the store.

20. The method of claim 12, the lottery game player selecting the type and number of lottery games to be played by taking selected ones of the plurality of lottery game tokens from within the store to the at least one point of sale (POS) terminal.

21. The method of claim 20, further comprising the step of the lottery game player presenting the selected ones of the lottery game tokens to the sales clerk for scanning at the at least one point of sale (POS) terminal.

22. The method of claim 12, the lottery game player verbally instructing a sales clerk to change the desired number or type of pre-printed lottery game tickets to be purchased, the sales clerk manually entering the game player's instructions into the at least one point of sale (POS) terminal.

23. The method of claim 12, the point of sale (POS) monitor looking up the scanned game identification code on a stored pre-printed lottery game ticket database to determine which type of lottery game is to be played.

24. The method of claim 12, further comprising the step of accumulating all of the scanned game identification codes for each sales transaction in the point of sale (POS) monitor, the point of sale (POS) monitor forwarding the accumulated game identification codes to the ticket dispenser.

25. The method of claim 12, the point of sale (POS) monitor communicating with a ticket dispenser controller in communication with the ticket dispenser.

26. The method of claim 25, the ticket dispenser controller identifying the ticket dispenser at the point of sale (POS) station.

27. The method of claim 25, the ticket dispenser controller looking up the identity of the ticket dispenser at the point of sale (POS) station on a stored database of ticket dispensers located within the store.

28. The method of claim 25, the ticket dispenser controller polling the ticket dispenser to determine if the desired number and type of pre-printed lottery game tickets are available therein.

29. The method of claim 25, the ticket dispenser controller instructing the ticket dispenser to dispense the desired number and type of pre-printed lottery game tickets therefrom.

30. The method of claim 25, the ticket dispenser controller communicating the number and type of pre-printed lottery game tickets dispensed by the ticket dispenser to the point of sale (POS) monitor.

31. A method of selling pre-printed lottery game tickets for purchase by a lottery game player within a store, the store having at least one point of sale (POS) terminal having a bar code reader adapted to scan product identification codes of items offered for sale, said method comprising the steps of:

providing a plurality of lottery game tokens at locations throughout the store;

the lottery game player selecting the pre-printed lottery games they wish to play by taking selected ones of the plurality of lottery game tokens from within the store to the at least one point of sale (POS) terminal;

scanning the selected ones of the lottery game tokens at the at least one point of sale (POS) terminal, each said token bearing a separate game identification code thereon identifying a single predetermined pre-printed lottery game;

detecting the scanned game identification codes with a point of sale (POS) monitor in communication with the at least one point of sale (POS) terminal;

providing a ticket dispenser supplied with at least one type of pre-printed lottery game ticket; and the point of sale (POS) monitor instructing the ticket dispenser to dispense the desired number and type of pre-printed lottery game tickets in response to the detection of the game identification codes.

32. The method of claim 31, the at least one point of sale (POS) terminal looking up through a networked point of sale (POS) system the amount to be charged for the pre-printed lottery game tickets so dispensed, the point of sale (POS) monitor then detecting the amount to be charged for the pre-printed lottery game tickets through the point of sale (POS) system.

33. The method of claim 31, the game player verbally instructing a sales clerk to change the desired number or type of pre-printed lottery game tickets to be purchased, the sales clerk manually entering the game player's instructions into the at least one point of sale (POS) terminal.

34. The method of claim 31, the step of dispensing the pre-printed lottery game tickets comprising the step of dispensing the pre-printed lottery game tickets from a supply of said tickets held within the ticket dispenser.

35. The method of claim 31, the point of sale (POS) monitor determining from the scanned game identification code which type of pre-printed lottery game is to be played.

36. The method of claim 31, the point of sale (POS) monitor looking up the scanned game identification code on a stored lottery game ticket database to determine which type of lottery game is to be played.

37. The method of claim 31, the point of sale (POS) monitor communicating with a ticket dispenser controller in communication with the ticket dispenser.

38. The method of claim 37, the ticket dispenser controller instructing the ticket dispenser to dispense the desired number and type of pre-printed lottery game tickets therefrom.

39. A method of selling pre-printed lottery game tickets for purchase by a lottery game player within a store, the store having at least one point of sale (POS) terminal having a bar code reader adapted to scan product identification codes of items offered for sale, said method comprising the steps of:

providing at least one type of pre-printed lottery game ticket;

scanning at least one lottery game token at the at least one point of sale (POS) terminal, each lottery game token bearing a game identification code thereon identifying a single predetermined pre-printed lottery game;

detecting the scanned game identification code with a point of sale (POS) monitor in communication with the at least one point of sale (POS) terminal;

the point of sale (POS) monitor communicating with a ticket dispenser controller in communication with a ticket dispenser;

the ticket dispenser controller instructing the ticket dispenser to dispense the desired number and type of pre-printed lottery game tickets therefrom; and the ticket dispenser controller communicating the number and type of pre-printed lottery game tickets so dispensed to the point of sale (POS) monitor.

40. The method of claim 39, the ticket dispenser controller polling the ticket dispenser to determine if the desired number and type of pre-printed lottery game tickets are available therein.

41. The method of claim 39, the step of dispensing the lottery game tickets comprising the step of dispensing the pre-printed lottery game tickets from a supply of said tickets held within the ticket dispenser.

42. The method of claim 39, further comprising the step of providing a plurality of said lottery game tokens at locations throughout the store.

43. The method of claim 42, the lottery game player selecting the type of lottery games to be played by taking selected ones of the plurality of lottery game tokens from within the store to the at least one point of sale (POS) terminal.

44. The method of claim 43, further comprising the step of the game player presenting the selected ones of the lottery game tokens to a sales clerk for scanning at the at least one point of sale (POS) terminal.

45. The method of claim 39, the game player verbally instructing a sales clerk to change the number or type of pre-printed lottery game tickets to be purchased, the sales clerk manually entering the game player's instructions into the at least one point of sale (POS) terminal.

46. The method of claim 39, the point of sale (POS) monitor determining from the scanned game identification code which type of lottery game is to be played.

47. The method of claim 39, the ticket dispenser controller identifying the ticket dispenser at the at least one point of sale (POS) terminal.

48. The method of claim 47, the ticket dispenser controller polling the ticket dispenser to determine if the desired number and type of pre-printed lottery game tickets are available therein.

49. A method of selling pre-printed lottery game tickets for purchase by a lottery game player within a store, the store having a point of sale (POS) system comprised of at least one point of sale (POS) terminal positioned at a point of sale (POS) station, the point of sale (POS) terminal having a bar code reader adapted to scan product identification codes of items offered for sale, said method comprising the steps of:

providing at least one type of pre-printed lottery game ticket;

scanning at least one lottery game token at the at least one point of sale (POS) terminal, each lottery game token bearing a game identification code thereon identifying a single predetermined pre-printed lottery game;

detecting the scanned game identification code and determining from the scanned game identification code the type of pre-printed lottery game tickets to be dispensed; and instructing an automated ticket dispenser to dispense the desired type of pre-printed lottery game tickets therefrom.

50. The method of claim 49, the at least one point of sale (POS) terminal looking up through the point of sale (POS) system the amount to be charged for the pre-printed lottery game tickets so dispensed, the point of sale (POS) monitor then detecting the amount to be charged for the pre-printed lottery game tickets through the point of sale (POS) system.

51. The method of claim 49, the step of dispensing the pre-printed lottery game tickets comprising the step of dispensing the pre-printed lottery game tickets from a supply of said tickets held within the ticket dispenser.

52. The method of claim 49, further comprising the step of logging each lottery game ticket sales transaction conducted at the at least one point of sale (POS) terminal.

53. The method of claim 52, further comprising the step of communicating with an off-site lottery computer and reporting the logged sales transactions thereto.

54. The method of claim 49, further comprising the step of selectively preparing a transaction report of all of the pre-printed lottery game tickets dispensed and sold at the at least one point of sale (POS) terminal.

55. The method of claim 49, further comprising the step of providing a plurality of said lottery game tokens at locations throughout the store.

56. The method of claim 55, the lottery game player selecting the pre-printed lottery games to be played by taking selected ones of the plurality of lottery game tokens from within the store to the at least one point of sale (POS) terminal.

57. The method of claim 56, further comprising the step of the game player presenting the selected ones of the lottery game tokens to a sales clerk for scanning at the at least one point of sale (POS) terminal.

58. The method of claim 49, the game player verbally instructing a sales clerk to change the desired number or type of pre-printed lottery game tickets to be purchased, the sales clerk manually entering the game player's instructions into the at least one point of sale (POS) terminal.

59. The method of claim 49, further comprising the step of looking up the scanned game identification code on a stored lottery game database to determine the desired type of pre-printed lottery game to be played.

60. The method of claim 49, further comprising the step of accumulating all of the scanned game identification codes for each sales transaction and communicating the accumulated game identification codes to the ticket dispenser.

61. The method of claim 49, further comprising the step of communicating with a ticket dispenser controller in communication with the ticket dispenser.

62. The method of claim 61, the ticket dispenser controller identifying the ticket dispenser at the at least one point of sale (POS) terminal.

63. The method of claim 62, the ticket dispenser controller looking up the identity of the ticket dispenser at the at least one point of sale (POS) terminal on a stored database of ticket dispensers located within the store.

64. The method of claim 61, the ticket dispenser controller polling the ticket dispenser to determine if the desired number and type of pre-printed lottery game tickets are available therein.

65. The method of claim 61, the ticket dispenser controller instructing the ticket dispenser to dispense the desired number and type of pre-printed lottery game tickets therefrom.

66. The method of claim 61, the ticket dispenser controller communicating the desired number and type of pre-printed lottery game tickets dispensed by the ticket dispenser to the point of sale (POS) monitor.

67. A system for selling pre-printed lottery game tickets for purchase by a lottery game player within a store, the store having a networked point of sale (POS) system including a at least one point of sale (POS) terminal having a bar code reader constructed and arranged to scan product identification codes of items offered for sale, said system comprising:

at least one lottery game token for being scanned at the at least one point of sale (POS) terminal, the lottery game token bearing a game identification code thereon identifying a single predetermined pre-printed lottery game;

a point of sale (POS) monitor in communication with the at least one point of sale (POS) terminal;

at least one ticket dispenser;

a ticket dispenser controller in communication with the point of sale (POS) monitor and the at least one ticket dispenser; and a supply of pre-printed lottery game tickets held within the ticket dispenser;

wherein the point of sale (POS) monitor detects the game identification code scanned into the point of sale (POS) system and determines therefrom the number and type of pre-printed lottery games to be played, and instructs the ticket dispenser controller of the number and type of pre-printed lottery game tickets to be dispensed;

and wherein the ticket dispenser controller signals the at least one ticket dispenser to dispense the desired number and type of pre-printed lottery game tickets therefrom and communicates to the point of sale (POS) monitor the number and type of pre-printed lottery game tickets so dispensed.

68. The system of claim 67, wherein the at least one point of sale (POS) terminal communicates with the point of sale (POS) system to determine the amount to be charged for the pre-printed lottery game tickets so dispensed, and the point of sale (POS) monitor detects the amount to be charged for the pre-printed lottery game tickets through the point of sale (POS) system.

69. The system of claim 67, said game identification code comprising a UPC code.

70. The system of claim 67, said ticket dispenser comprising an automated pre-printed lottery game ticket dispenser.

71. The system of claim 67, said point of sale (POS) monitor comprising a computer.

72. The system of claim 67, wherein the point of sale (POS) monitor comprises the ticket dispenser controller.

73. The system of claim 67, said ticket dispenser controller comprising a computer.

74. The system of claim 67, further comprising a network connecting the point of sale (POS) monitor to the ticket dispenser controller.

75. The system of claim 74, said network comprising an Ethernet network.

76. The system of claim 67, further comprising a network connecting the ticket dispenser controller to the at least one ticket printer.

77. The system of claim 76, said network comprising a wireless network.

78. A system for selling pre-printed lottery game tickets within a store, the store having at least one point of sale (POS) terminal with a bar code reader adapted to scan product identification codes of items offered for sale, said system comprising:

at least one lottery game token bearing a game identification code thereon for being scanned at the at least one point of sale (POS) terminal, the game identification code identifying a single predetermined pre-printed lottery game;

a point of sale (POS) monitor in communication with the at least one point of sale (POS) terminal, the point of sale (POS) monitor being constructed and arranged to detect the scanned game identification code of said at least one token within the point of sale (POS) system, and to determine the type of lottery game to be played thereby;

at least one ticket dispenser having a supply of at least one type of pre-printed lottery game tickets held therein; and a ticket dispenser controller in communication with the point of sale (POS) monitor and the at least one ticket dispenser controller;

the ticket dispenser controller being constructed and arranged to identify the at least one ticket dispenser located at the at least one point of sale (POS) terminal, and to poll the at least one ticket dispenser to determine if the ticket dispenser is supplied with the desired number and type of pre-printed lottery game tickets to be dispensed therefrom.

79. A system for selling pre-printed lottery game tickets for purchase by a lottery game player within a store, the store having at least one point of sale (POS) terminal having a bar code reader adapted to scan product identification codes of items offered for sale, said system comprising:

at least one lottery game token bearing a game identification code thereon for being scanned at the at least one point of sale (POS) terminal, the game identification code identifying a single predetermined pre-printed lottery game;

a point of sale (POS) monitor in communication with the at least one point of sale (POS) terminal; and at least one ticket dispenser having a supply of at least one type of pre-printed instant lottery game tickets held therein;

the point of sale (POS) monitor being in communication with the at least one ticket dispenser, and being constructed and arranged to detect the scanned game identification code and in response thereto to instruct the at least one ticket dispenser to dispense the desired number and type of pre-printed lottery game tickets therefrom.

80. The system of claim 79, the point of sale (POS) monitor being in communication with a ticket dispenser controller, said ticket dispenser controller being in communication with the at least one ticket dispenser.

81. The system of claim 80, wherein the ticket dispenser controller is constructed and arranged to poll the at least one ticket dispenser to determine if the ticket dispenser has the desired number and type of pre-printed lottery game tickets to be dispensed therefrom.

82. The system of claim 80, wherein the ticket dispenser controller communicates the number and type of pre-printed lottery game tickets dispensed from the at least one ticket dispenser to the point of sale (POS) monitor.

83. The system of claim 80, wherein the ticket dispenser controller identifies the at least one ticket dispenser at the at least one point of sale (POS) terminal at which said at least one token has been scanned.

84. The system of claim 83, wherein the ticket dispenser controller looks up the at least one ticket dispenser at the at least one point of sale (POS) terminal from a stored database of ticket dispensers located within the store.

85. The system of claim 79, wherein the point of sale (POS) monitor logs each lottery game ticket sales transaction completed at the at the at least one point of sale (POS) terminal.

86. The method of claim 79, wherein the point of sale (POS) monitor is constructed and arranged to selectively prepare a transaction report of all of the pre-printed lottery game tickets dispensed and sold at the at least one point of sale (POS) terminal.

87. The system of claim 79, wherein the point of sale (POS) monitor determines the type of pre-printed lottery (POS) game to be played from the game identification code scanned into the point of sale (POS) system.

88. The system of claim 79, wherein the point of sale (POS) monitor looks up the desired type of pre-printed lottery game to be played from the game identification code in a stored database of lottery games.

89. The system of claim 79, wherein the point of sale (POS) monitor accumulates all of the scanned game identification codes from the at least one point of sale (POS) terminal and forwards the accumulated game identification codes to a ticket dispenser controller.

90. The system of claim 89, wherein the ticket dispenser controller determines from the forwarded game identification codes the number and type of pre-printed lottery game tickets to be dispensed from the at least one ticket dispenser.

91. A method of selling an on-line lottery game ticket to a lottery game player within a store, the store having at least one point of sale (POS) terminal having a bar code reader adapted to scan product identification codes of items offered for sale, said method comprising the steps of:

the game player picking up at least one lottery game token from within the store, the at least one token bearing a game identification code thereon, the game identification code identifying a lottery game;

the game player taking the at least one token to the at least one point of sale (POS) terminal where the token is scanned;

detecting the scanned game identification code with a point of sale (POS) monitor in communication with the at least one point of sale (POS) terminal;

generating a random series of lottery play numbers in response to the detection of the game identification code;

the point of sale (POS) monitor forwarding the lottery play numbers to a ticket printer controller;

the ticket printer controller instructing a ticket printer to print at least one lottery game ticket bearing the selected lottery play numbers thereon, the ticket printer printing the at least one lottery game ticket;

the ticket printer controller communicating to the point of sale (POS) monitor that the at least one lottery game ticket has been printed and dispensed; and the point of sale (POS) monitor instructing the at least one point of sale (POS) terminal of the amount to be charged for the at least one lottery game ticket;

whereby a sales clerk collects payment for, and delivers the at least one lottery game ticket to the game player.

92. The method of claim 91, the point of sale (POS) monitor generating the lottery play numbers and communicating the lottery play numbers to an off-site lottery computer.

93. The method of claim 92, the lottery computer receiving the lottery play numbers from the point of sale (POS) monitor, and authorizing the lottery game ticket to be printed.

94. The method of claim 91, the at least one point of sale (POS) terminal looking up the amount to be charged for the lottery game tickets so dispensed, the point of sale (POS) monitor then detecting the amount to be charged for the lottery game tickets.

95. A method of selling an on-line lottery game ticket to a lottery game player within a store, the store having a networked point of sale (POS) system with at least one point of sale (POS) terminal having a bar code reader adapted to scan product identification codes of items offered for sale, said method comprising the steps of:

the game player picking up at least one lottery game token from within the store, the at least one token bearing a game identification code thereon, the game identification code identifying an on-line type of lottery game;

the game player taking the at least one token to the at least one point of sale (POS) terminal where the at least one token is scanned;

detecting the scanned game identification code with a point of sale (POS) monitor in communication with the at least one point of sale (POS) terminal;

generating a random series of lottery play numbers in response to the detection of the scanned game identification code;

forwarding the lottery play numbers to a ticket printer and printing the lottery game ticket thereon; and instructing the at least one point of sale (POS) terminal of the amount to be charged for the lottery game ticket.

96. The method of claim 95, further comprising the step of the point of sale (POS) monitor detecting the scanned game identification code.

97. The method of claim 95, further comprising the step of the point of sale (POS) monitor recording the sale of the lottery game tickets.

98. The method of claim 95, further comprising the step of the point of sale (POS) monitor logging the lottery game ticket sales transaction.

99. The method of claim 95, further comprising the step of selectively preparing a transaction report of all of the lottery game tickets printed and sold at the at least one point of sale (POS) terminal.

100. The method of claim 95, the step of generating the lottery play numbers further comprising the step of the point of sale (POS) monitor generating the lottery play numbers.

101. The method of claim 100, further comprising the steps of the point of sale (POS) monitor communicating the lottery play numbers so selected to an off-site lottery computer, and the lottery computer returning an acknowledgement thereof to the point of sale (POS) monitor.

102. The method of claim 95, further comprising the steps of the point of sale (POS) monitor communicating with an off-site lottery computer, the lottery computer generating the lottery play numbers and communicating the numbers so selected to point of sale (POS) monitor.

103. The method of claim 95, further comprising the step of using the scanned game identification code to determine the type of lottery game to be played.

104. The method of claim 103, the point of sale (POS) monitor looking up the scanned game identification code on a stored lottery game database to determine which type of lottery game is to be played.

105. The method of claim 95, further comprising a ticket printer controller in communication with the point of sale (POS) monitor, the ticket printer controller identifying the ticket printer at the at least one point of sale (POS) terminal prior to instructing the ticket printer to print the lottery game ticket.

106. The method of claim 105, the ticket printer controller looking up the identity of the ticket printer at the at least one point of sale (POS) terminal on a stored database of ticket printers located within the store.

107. The method of claim 95, further comprising the step of providing a plurality of said lottery game tokens at locations throughout the store.

108. The method of claim 107, the lottery game player selecting the lottery games to be played by taking selected ones of the plurality of lottery game tokens from within the store to the at least one point of sale (POS) terminal.

109. The method of claim 108, further comprising the step of the game player presenting the selected ones of the lottery game tokens to a sales clerk for scanning at the at least one point of sale (POS) terminal.

110. The method of claim 95, the game player verbally instructing a sales clerk to change the desired number or type of lottery game tickets to be purchased, the sales clerk manually entering the game player's instructions into the at least one point of sale (POS) terminal.

111. A method of selling an on-line lottery game ticket to a lottery game player within a store, the store having at least one point of sale (POS) terminal having a bar code reader adapted to scan product identification codes of items offered for sale, said method comprising the steps of:

the game player picking up at least one lottery game token from within the store, each lottery game token bearing a predetermined game identification code thereon, the game identification code identifying a lottery game;

scanning the at least one token at the least one point of sale (POS) terminal;

detecting the scanned game identification code;

generating a random series of lottery play numbers in response to the detection of the scanned game identification code; and printing a lottery game ticket bearing the lottery play numbers thereon on a lottery game ticket printer.

112. A system for use in selling an on-line lottery game ticket to a lottery game player within a store, the store having at least one point of sale (POS) terminal having a bar code reader adapted to scan product identification codes of items offered for sale, said method comprising the steps of:

at least one lottery game token bearing a game identification code thereon for being scanned at the at least one point of sale (POS) terminal, the game identification code identifying a lottery game;

a point of sale (POS) monitor in communication with the at least one point of sale (POS) terminal, the point of sale (POS) monitor being constructed and arranged to detect the scanned game identification code;

means for generating a random series of lottery play numbers in response to the detection of the game identification code by the point of sale (POS) monitor;

a lottery game ticket printer;

a ticket printer controller in communication with the point of sale (POS) monitor and the ticket printer, the ticket printer controller being constructed and arranged to instruct the ticket printer to print at least one lottery game ticket bearing the lottery play numbers thereon.

113. The system of claim 112, wherein the ticket printer controller communicates to the point of sale (POS) monitor that the at least one lottery game ticket has been printed and dispensed.

114. The system of claim 112, wherein the at least one point of sale (POS) terminal communicates with a point of sale (POS) system to determine the amount to be charged for the lottery game tickets so dispensed, and the point of sale (POS) monitor detects the amount to be charged for the lottery game tickets through the point of sale (POS) system.

115. The system of claim 112, the point of sale (POS) monitor comprising a computer, said means for generating a random series of lottery play numbers comprising a random number generator program stored within and executed by point of sale (POS) monitor.

116. The system of claim 115, further comprising an off-site lottery computer, the point of sale (POS) monitor being in communication with the lottery computer and communicating the lottery play numbers so selected to the lottery computer, the lottery computer recording the lottery game play numbers therein and returning an acknowledgement thereof to the point of sale (POS) monitor.

117. The system of claim 112, further comprising an off-site lottery computer, said means for generating a random series of lottery play numbers comprising a random number generator program stored within and executed by the lottery computer, wherein the lottery computer generates the lottery play numbers and communicates the numbers so selected to the point of sale (POS) monitor.

118. The system of claim 112, said point of sale (POS) monitor comprising a computer.

119. The system of claim 118, said point of sale (POS) monitor comprising said ticket printer controller.

120. The system of claim 118, wherein the point of sale (POS) monitor looks up the type of lottery game to be played on a stored database of lottery games to determine which type of lottery game is to be played.

121. The system of claim 112, said ticket printer controller comprising a computer.

122. The system of claim 121, wherein the ticket printer controller looks up the lottery game ticket printer at the at least one point of sale (POS) terminal on a stored database of lottery game ticket printers located within the store.

123. The system of claim 112, wherein the point of sale (POS) monitor is networked with a point of sale (POS) system present within the store.

124. The system of claim 112, wherein the ticket printer controller is networked with the point of sale (POS) Monitor.

125. The system of claim 124, wherein the ticket printer controller is networked with the point of sale (POS) Monitor through an Ethernet network.

126. The system of claim 112, wherein the ticket printer controller is networked with the ticket printer.

127. The system of claim 126, wherein the ticket printer controller is networked with the ticket printer through a wireless network.

128. A method of selling pre-printed and on-line lottery game tickets for purchase by a lottery game player within a store, the store having at least one point of sale (POS) terminal having a bar code reader adapted to scan product identification codes of items offered for sale, said method comprising the steps of:

providing at least one type of pre-printed lottery game tickets;

the game player picking up at least one lottery game token from within the store, the at least one token bearing a game identification code thereon;

the game player taking the at least one token to the at least one point of sale (POS) terminal where the token is scanned;

detecting the scanned game identification code of the at least one token with a point of sale (POS) monitor in communication with the at least one point of sale (POS) terminal;

the point of sale (POS) monitor determining from the scanned game identification code whether an on-line or an pre-printed type of lottery game is to be played;

generating a series of random lottery play numbers for each on-line lottery game to be played and forwarding the lottery play numbers to at least one lottery game ticket printer, the at least one ticket printer printing at least one lottery game ticket bearing the lottery play numbers thereon; and sending a dispense ticket command to at least one lottery game ticket dispenser for each type of pre-printed lottery game to be played, the at least one ticket dispenser dispensing the desired number and type of pre-printed lottery game tickets therefrom.

129. The method of claim 128, further comprising the steps of the at least one point of sale (POS) terminal looking up through a networked point of sale (POS) system the amount to be charged for the lottery game tickets so dispensed, the point of sale (POS) monitor then detecting the amount to be charged for the lottery game tickets through the point of sale (POS) system.

130. The method of claim 128, further comprising the step of accumulating all of the scanned game identification codes and forwarding the codes to the at least one ticket printer and the at least one ticket dispenser, respectively.

131. The method of claim 128, further comprising the step of the point of sale (POS) monitor communicating with a ticket controller.

132. The method of claim 131, the ticket controller identifying the at least one ticket printer prior to instructing the printer to print the lottery game ticket.

133. The method of claim 132, the ticket controller looking up the identity of the at least one ticket printer on a stored database of ticket printers located within the store.

134. The method of claim 131, the ticket controller identifying the at least one ticket dispenser at the point of sale (POS) station, and polling the at least one ticket dispenser to determine if the desired number and type of pre-printed lottery game tickets are available therein.

135. The method of claim 131, the ticket controller notifying the point of sale (POS) monitor of the number and type of lottery game tickets that have been printed and dispensed, respectively.

136. The method of claim 135, further comprising the step of looking up the scanned game identification code on a stored lottery game database to determine which type of lottery game is to be played.

137. The method of claim 128, further comprising the step of recording the sale of the lottery game tickets, and logging all such sales transactions.

138. The method of claim 128, further comprising the step of selectively preparing a transaction report of all of the lottery game tickets sold at the at least one point of sale (POS) terminal.

139. The method of claim 128, the point of sale (POS) monitor communicating with a ticket controller, the ticket controller communicating with each of the at least one ticket printer and the at least one ticket dispenser, respectively, and communicating to the point of sale (POS) monitor the number and type of lottery game tickets printed and dispensed, respectively.

140. The method of claim 128, the point of sale (POS) monitor communicating the lottery play numbers to an off-site lottery computer, the lottery computer returning an acknowledgement thereof to the point of sale (POS) monitor.

141. The method of claim 128, the point of sale (POS) monitor communicating with an off-site lottery computer, the lottery computer generating the lottery play numbers and communicating the numbers so selected to the point of sale (POS) monitor.

142. The method of claim 128, further comprising the step of using the scanned game identification code to determine the type of lottery game to be played.

143. A method of selling pre-printed and on-line lottery game tickets for purchase by a lottery game player within a store, the store having at least one point of sale (POS) terminal having a bar code reader adapted to scan product identification codes of items offered for sale, said method comprising the steps of:

provided at least one type of pre-printed lottery game tickets;

providing at least one pre-printed lottery game token within the store, the at least one token bearing a lottery game identification code thereon;

scanning the at least one token at the at least one point of sale (POS) terminal;

detecting the scanned game identification code with a point of sale (POS) monitor in communication with the at least one point of sale (POS) terminal, the point of sale (POS) monitor determining from the scanned game identification code the type of lottery game to be played;

the point of sale (POS) monitor sending a dispense ticket command to at least one lottery game ticket dispenser for dispensing the desired number and type of pre-printed lottery game tickets therefrom;

the point of sale (POS) monitor sending a print ticket command to at least one ticket printer for printing the desired number of on-line lottery game tickets therefrom.

144. The method of claim 143, further comprising the step of instructing the point of sale (POS) terminal of the amount to be charged for the lottery game tickets so dispensed and printed, respectively.

145. The method of claim 143, further comprising the steps of the point of sale (POS) monitor generating a series of random lottery play numbers in response to the detection of the scanned on-line lottery game identification code for each on-line lottery game to be played.

146. The method of claim 145, the point of sale (POS) monitor communicating the lottery play numbers to an off-site lottery computer, the lottery computer returning an acknowledgement thereof to the point of sale (POS) monitor.

147. The method of claim 143, the point of sale (POS) monitor communicating with an off-site lottery computer, the lottery computer generating a series of random lottery play numbers for each on-line lottery game identification code detected by the point of sale (POS) monitor and communicating the numbers so selected to the point of sale (POS) monitor, the point of sale (POS) monitor forwarding the lottery play numbers to the at least one lottery game ticket printer.

148. The method of claim 143, the point of sale (POS) monitor communicating with a ticket controller, the ticket controller communicating with each of the at least one ticket printer and the at least one ticket dispenser, respectively, and communicating to the point of sale (POS) monitor the number and type of lottery game tickets printed and dispensed, therefrom, respectively.

149. The method of claim 148, the ticket controller instructing the printer to print the desired number of on-line lottery game tickets.

150. The method of claim 148, the ticket controller instructing the at least one ticket dispenser to dispense the desired number and type of pre-printed lottery game tickets therefrom.

151. The method of claim 148, the ticket controller communicating to the point of sale (POS) monitor that the desired number and type of lottery game tickets have been printed and dispensed.

152. The method of claim 143, further comprising the steps of providing a plurality of pre-printed lottery game tokens for a variety of differing types of lottery games throughout the store, each game token bearing a game identification code specific to a predetermined type of lottery game.

153. The method of claim 152, the lottery game player selecting the type and number of lottery games to be played by taking selected ones of the plurality of lottery game tokens from within the store to the at least one point of sale (POS) terminal.

154. The method of claim 153, further comprising the step of the lottery game player presenting the selected ones of the lottery game tokens to a sales clerk for scanning at the at least one point of sale (POS) terminal.

155. The method of claim 153, the lottery game player verbally instructing the sales clerk to change the desired number or type of lottery game tickets to be purchased, the sales clerk manually entering the game player's instructions into the at least one point of sale (POS) terminal.

156. The method of claim 143, further comprising the step of selectively preparing a transaction report of all of the lottery game tickets sold at the at least one point of sale (POS) terminal.

157. A method of selling pre-printed and on-line lottery game tickets for purchase by a lottery game player within a store, the store having at least one point of sale (POS) terminal having a bar code reader adapted to scan product identification codes of items offered for sale, said method comprising the steps of:

providing at least one type of pre-printed lottery game tickets;

providing at least one lottery game token within the store, the at least one token bearing a game identification code thereon;

scanning the at least one token at the at least one point of sale (POS) terminal;

detecting the game identification code scanned into the point of sale (POS) system;

determining from the scanned game identification code the type of lottery game to be played;

sending a dispense ticket command to at least one ticket dispenser for dispensing the desired number and type of pre-printed lottery game tickets therefrom; and sending a print ticket command to at least one ticket printer for printing the desired number of on-line lottery game tickets therefrom.

158. A system for selling pre-printed and on-line lottery game tickets for purchase by a lottery game player within a store, the store having at least one point of sale (POS) terminal having a bar code reader adapted to scan product identification codes of items offered for sale, said system comprising:

at least one lottery game token bearing a game identification code thereon for being scanned at the at least one point of sale (POS) terminal;

a point of sale (POS) monitor in communication with the at least one point of sale (POS) terminal;

at least one lottery game ticket dispenser;

a supply of at least one type of pre-printed lottery game tickets held within the at least one ticket dispenser;

at least one lottery game ticket printer;

a ticket controller in communication with the point of sale (POS) monitor, the at least one ticket dispenser, and the at least one ticket printer;

wherein said point of sale (POS) monitor is constructed and arranged to detect the scanned game identification code and in response thereto to instruct the ticket dispenser controller of the number and type of pre-printed lottery game tickets to be dispensed and the number of on-line lottery game tickets to be printed, respectively; and said ticket controller being constructed and arranged to signal the at least one ticket dispenser to dispense the desired number and type of pre-printed lottery game tickets therefrom, to signal the at least one ticket printer to print the desired number of on-line lottery game tickets therefrom, and to communicate to the point of sale (POS) monitor the number and type of lottery game tickets dispensed from the at least one ticket dispenser and printed by the at least one ticket printer, respectively.

159. The system of claim 158, wherein the at least one point of sale (POS) terminal communicates with a point of sale (POS) system to determine the amount to be charged for the lottery game tickets so dispensed, and the point of sale (POS) monitor detects the amount to be charged for the lottery game tickets through the point of sale (POS) system.

160. The system of claim 158, further comprising an off-site lottery computer in communication with the point of sale (POS) monitor.

161. The system of claim 160, wherein the point of sale (POS) monitor is constructed and arranged to generate a series of random numbers for each on-line lottery game to be played and to communicate the lottery play numbers to the lottery computer, the lottery computer being constructed and arranged to send a confirmation thereof to the point of sale (POS) monitor authorizing the lottery game ticket to be printed.

162. The system of claim 160, wherein the lottery computer generates a series of random numbers for each on-line lottery game to be played, transmits the lottery play numbers to the point of sale (POS) monitor, and authorizes the lottery game ticket to be printed.

163. The system of claim 158, wherein said game identification code on the at least one game token is for a predetermined type of lottery game.

164. The system of claim 158, said game identification code comprising a UPC code.

165. The system of claim 158, said at least one ticket dispenser comprising an automated pre-printed lottery game ticket dispenser.

166. The system of claim 158, wherein the point of sale (POS) monitor looks up the scanned game identification code on a stored lottery game database to determine which type of lottery game is to be played.

167. The system of claim 158, wherein the ticket controller looks up the at least one ticket dispenser, and the at least one ticket printer at the point of sale (POS) station at the at least one point of sale (POS) terminal, respectively, on a stored database of the ticket dispensers and ticket printers located within the store.

168. The system of claim 167, wherein the ticket controller polls the at least one ticket dispenser to determine if the desired number and type of pre-printed lottery game tickets are available for being dispensed.

169. The system of claim 158, wherein the point of sale (POS) monitor accumulates all of the scanned game identification codes and forwards the accumulated game identification codes to the ticket controller.

170. The system of claim 158, wherein the ticket controller determines the number and type of pre-printed lottery game tickets to be dispensed from the at least one ticket dispenser and the number of on-line lottery game tickets to be printed.

171. The method of claim 158, wherein the point of sale (POS) monitor is constructed and arranged to selectively prepare a transaction report of all of the lottery game tickets sold at the at least one point of sale (POS) terminal.

172. A system for selling pre-printed and on-line lottery game tickets for purchase by a lottery game player within a store, the store having a networked point of sale (POS) system therein, in communication with at least one point of sale (POS) terminal having a bar code reader constructed and arranged to scan product identification codes of items offered for sale, said system comprising:

at least one lottery game token for being scanned at the at least one point of sale (POS) terminal, said at least one token bearing a game identification code thereon;

a point of sale (POS) monitor in communication with the at least one point of sale (POS) terminal;

at least one lottery game ticket dispenser;

a supply of at least one type of pre-printed lottery game tickets held within the at least one ticket dispenser; and at least one lottery game ticket printer;

the point of sale (POS) monitor being constructed and arranged to detect the game identification code scanned through the at least one point of sale (POS) terminal and the type of lottery game to be played thereby, and to signal the at least one ticket dispenser to dispense the desired number and type of pre-printed lottery game tickets therefrom, and the at least one ticket printer to print the desired number of on-line lottery game tickets therefrom.

173. The system of claim 172, wherein the at least one point of sale (POS) terminal communicates with the point of sale (POS) system to determine the amount to be charged for the lottery game tickets so dispensed and printed, respectively, and the point of sale (POS) monitor detects the amount to be charged for the lottery game tickets through the point of sale (POS) system.

174. The system of claim 172, said game identification code identifying a single predetermined type of lottery game.

175. The system of claim 174, said predetermined type of lottery game being one of the lottery games selected from the group of lottery games consisting of a pre-printed lottery game and an on-line lottery game.

176. The system of claim 172, the point of sale (POS) monitor comprising a computer.

177. The system of claim 176, the point of sale (POS) monitor having a random number generator program stored therein and executed thereby to generate a random series of lottery play numbers for each on-line lottery game to be played.

178. The system of claim 172, further comprising a ticket controller in communication with the point of sale (POS) monitor, the ticket controller being in communication with the at least one ticket dispenser and the at least one ticket printer at the at least one point of sale (POS) terminal.

179. The system of claim 178, wherein the ticket controller instructs the at least one ticket dispenser to dispense the desired number and type of pre-printed lottery game tickets therefrom, and the at least one ticket printer to print the desired number of on-line lottery game tickets therefrom.

180. A system for selling pre-printed and on-line lottery game tickets within a store, the store having at least one point of sale (POS) terminal having a bar code reader adapted to scan product identification codes of items offered for sale, said system comprising:

at least one lottery game token bearing a game identification code thereon for being scanned at the at least one point of sale (POS) terminal;

at least one lottery game ticket dispenser having a supply of at least one type of pre-printed lottery game tickets held therein;

at least one lottery game ticket printer;

a control means, in communication with the at least one point of sale (POS) terminal, for detecting the scanned game identification code and in response thereto determining the type of lottery game to be played thereby;

said control means being in communication with the at least one ticket dispenser and the at least one ticket printer, said control means instructing the at least one ticket dispenser to dispense the desired number and type of pre-printed lottery game tickets therefrom and instructing the at least one ticket printer to print the desired number of on-line game tickets therefrom.

181. The system of claim 180, said control means communicating to the at least one point of sale (POS) terminal the amount to be charged for the lottery game tickets so dispensed and printed, respectively.

182. A method of selling and dispensing an item having monetary value in a store, the store having a networked point of sale (POS) system with at least one point of sale (POS) terminal having a bar code reader adapted to scan product identification codes of items offered for sale, said method comprising:

providing, within the store, at least one token bearing a predetermined product identification code thereon for the item to be purchased;

scanning the at least one token at the at least one point of sale (POS) terminal;

detecting the scanned product identification code and determining from the scanned product identification code the type of item to be dispensed; and instructing an item dispenser to dispense the items selected for purchase.

183. The method of claim 182, further comprising the steps of the at least one point of sale (POS) terminal looking up through the point of sale (POS) system the amount to be charged for the lottery game tickets so dispensed, the point of sale (POS) monitor then detecting the amount to be charged for the lottery game tickets through the point of sale (POS) system.

184. The method of claim 182, further comprising the step of determining from the scanned product identification code the monetary value of the type of item to be dispensed.

185. The method of claim 182, further comprising the step of looking up the scanned product identification code on a stored product identification code database to determine which type of item is to be dispensed.

186. The method of claim 182, further comprising the step of accumulating all of the scanned product identification codes for each sales transaction and communicating the accumulated product identification codes to the item dispenser.

187. The method of claim 182, the step of dispensing the item including the step of dispensing one of the items selected from the group of items consisting of postage stamps, telephone calling cards, gift certificates, debit cards, and money orders of a predetermined monetary value.

188. A method of selling and printing an item having monetary value in a store, the store having a networked point of sale (POS) system with at least one point of sale (POS) terminal having a bar code reader adapted to scan product identification codes of items offered for sale, said method comprising:

providing, within the store, at least one token bearing a predetermined product identification code thereon for the item to be purchased;

scanning the at least one token at the at least one point of sale (POS) terminal;

detecting the scanned product identification code and determining from the scanned product identification code the type of item to be sold; and instructing a printer at the at least one point of sale (POS) terminal to print the item selected for purchase.

189. The method of claim 188, further comprising the steps of the at least one point of sale (POS) terminal looking up through the point of sale (POS) system the amount to be charged for the items printed, the point of sale (POS) monitor then detecting the amount to be charged for said items through the point of sale (POS) system.

190. The method of claim 188, further comprising the step of determining from the scanned product identification code the monetary value of the items to be sold.

191. The method of claim 188, further comprising the step of looking up the scanned product identification code on a stored product identification code database to determine the type of item to be sold.

192. The method of claim 188, further comprising the step of accumulating all of the scanned product identification codes for each sales transaction and communicating the accumulated game identification codes to the printer.

193. The method of claim 188, the step of printing the item including the step of printing a negotiable document of a monetary value determined by the product identification code.

194. The method of claim 188, the items of monetary value to be printed by the item printer comprising one of the items selected from the group of items consisting of a money order, a rebate check, and a gift certificate.

195. The method of claim 188, the step of printing the item including the step of a purchaser verbally instructing a sales clerk at the at least one point of sale (POS) terminal of the monetary value of a negotiable document to be printed thereat, the sales clerk manually entering the monetary value into the at least one point of sale (POS) terminal.

196. A system for selling and dispensing an item having monetary value for use in a store, the store having at least one point of sale (POS) terminal having a bar code reader adapted to scan product identification codes of items offered for sale, said method comprising:

at least one token bearing a predetermined product identification code thereon for being scanned at the at least one point of sale (POS) terminal;

a point of sale (POS) monitor in communication with the at least one point of sale (POS) terminal;

the point of sale (POS) monitor being constructed and arranged to detect the scanned product identification code and to determine therefrom the type of item to be sold and to determine therefrom the identity of the item to be sold; and an item dispenser at the at least one point of sale (POS) terminal having a supply of the items to be dispensed housed therein;

wherein the point of sale (POS) monitor instructs the item dispenser to dispense the item selected for purchase, the point of sale (POS) monitor informing the at least one point of sale (POS) terminal of the amount to be charged for the item so dispensed.

197. The system of claim 196, the point of sale (POS) monitor being constructed and arranged to determine the value of the item to be sold from the product identification code.

198. The system of claim 196, the point of sale (POS) monitor comprising a computer, said computer having a stored product identification code database therein, the point of sale (POS) monitor looking up the type of the item to be sold in said database.

199. The system of claim 196, the item of monetary value to be dispensed from the item dispenser comprising one of the items selected from the group of items consisting of postage stamps, telephone calling cards, gift certificates, debit cards, and money orders of a predetermined monetary value.

200. A system for selling an item having monetary value for use in a store, the store having at least one point of sale (POS) terminal, the at least one point of sale (POS) terminal having a bar code reader adapted to scan product identification codes of items offered for sale, said method comprising:

at least one token bearing a predetermined product identification code thereon for being scanned at the at least one point of sale (POS) terminal;

a point of sale (POS) monitor in communication with the at least one point of sale (POS) terminal;

the point of sale (POS) monitor being constructed and arranged to detect the scanned product identification code and to determine therefrom the type of item to be sold and to determine therefrom the identity of the item to be sold;

an item dispenser having a supply of the items to be dispensed housed therein; and an item printer;

wherein the point of sale (POS) monitor instructs the item dispenser to dispense and the item printer to print, respectively, the items selected for purchase, the point of sale (POS) monitor informing the at least one point of sale (POS) terminal of the amount to be charged for the item so dispensed and printed, respectively.

201. The system of claim 200, the items of monetary value to be dispensed from the item dispenser comprising one of the items selected from the group of items consisting of postage stamps, telephone calling cards, gift certificates, debit cards, and money orders of a predetermined monetary value.

202. The system of claim 200, the items of monetary value to be printed by the item printer including a negotiable document of a monetary value determined by the product identification code.

203. A method of selling and dispensing pre-printed lottery game tickets for purchase by a lottery game player within a store, the store having at least one point of sale (POS) terminal with a bar code reader adapted to scan product identification codes of items offered for sale, said method comprising the steps of:

providing a ticket dispenser supplied with at least one type of pre-printed lottery game ticket;

the game player verbally requesting the purchase of a lottery game ticket from the sales clerk;

the sales clerk manually entering the player's request into the at least one point of sale (POS) terminal;

detecting the game identification code of the requested game ticket with a point of sale (POS) monitor in communication with the at least one point of sale (POS) terminal;

the point of sale (POS) monitor determining from the entered game identification code the type of lottery game to be played;

the point of sale (POS) monitor then communicating with a ticket dispenser controller; and the ticket dispenser controller sending a dispense ticket command to the ticket dispenser such that the desired number and type of pre-printed lottery game tickets are dispensed therefrom;

whereby a sales clerk collects payment for, and delivers the pre-printed lottery game tickets to the game player.

204. A method of selling pre-printed lottery game tickets for purchase by a lottery game player within a store, the store having at least one point of sale (POS) terminal, said method comprising the steps of:

providing a ticket dispenser supplied with at least one type of a pre-printed lottery game ticket;

the game player verbally requesting the purchase of a pre-printed lottery game ticket from the sales clerk;

the sales clerk entering the game requested into the at least one point of sale (POS) terminal;

detecting the entered game identification code associated with the desired lottery game with a point of sale (POS) monitor in communication with the at least one point of sale (POS) terminal; and the point of sale (POS) monitor instructing a ticket dispenser to dispense the desired number and type of pre-printed lottery game tickets in response to the detection of the game identification codes.

205. A method of selling pre-printed and on-line lottery game tickets for purchase by a lottery game player within a store, the store having at least one point of sale (POS) terminal, said method comprising the steps of:

the game player verbally requesting the purchase of a lottery game ticket from the sales clerk, the sales clerk entering the requested lottery game ticket request into the at least one point of sale (POS) terminal;

detecting a game identification code associated with the requested game with a point of sale (POS) monitor in communication with the at least one point of sale (POS) terminal;

the point of sale (POS) monitor determining from the game identification code whether an on-line or a pre-printed type of lottery game is to be played;

generating a series of random lottery play numbers for each on-line lottery game to be played and forwarding the lottery play numbers to at least one lottery game ticket printer, the at least one ticket printer printing at least one lottery game ticket bearing the lottery play numbers thereon; and sending a dispense ticket command to at least one lottery game ticket dispenser for each type of pre-printed lottery game to be played, the at least one ticket dispenser dispensing the desired number and type of pre-printed lottery game tickets therefrom.

206. A method of selling pre-printed and on-line lottery game tickets for purchase by a lottery game player within a store, the store having at least one point of sale (POS) terminal, said method comprising the steps of:

the game player verbally requesting the purchase of a lottery game ticket from the sales clerk;

the sales clerk pressing a pre-programed key for the requested game on the at least one point of sale (POS) terminal;

detecting a game identification code associated with the requested game with a point of sale (POS) monitor in communication with the at least one point of sale (POS) terminal;

the point of sale (POS) monitor determining from the game identification code whether an on-line or a pre-printed type of lottery game is to be played;

sending a print ticket command to at least one lottery game ticket printer for each on-line lottery game to be played and printing at least one lottery game ticket bearing the lottery play numbers thereon; and sending a dispense ticket command to at least one lottery game ticket dispenser for each pre-printed lottery game to be played and dispensing the desired number and type of pre-printed lottery game tickets therefrom.

207. A method of selling pre-printed lottery game tickets for purchase by a lottery game player within a store, the store having a point of sale (POS) terminal, said method comprising the steps of:

providing at least one type of pre-printed lottery game ticket;

the game player verbally instructing a sales clerk of the number of pre-printed lottery game tickets to be purchased, the sales clerk manually entering the game player's instructions into the point of sale (POS) terminal, detecting a game identification code associated with each such requested lottery game ticket; and instructing an automated ticket dispenser to dispense the desired type of pre-printed lottery game tickets therefrom.

208. The method of claim 207, the at least one point of sale (POS) terminal looking up the game identification code on a stored lottery game database to determine which type of lottery game is to be to be played.

209. The method of claim 208, the game identification code comprising a universal product code (UPC).

210. A method of selling on-line lottery game tickets for purchase by a lottery game player within a store, the store having a point of sale (POS) terminal, said method comprising the steps of:

the game player verbally instructing a sales clerk of the number of on-line lottery game tickets to be purchased, the sales clerk manually entering the game player's instructions into the point of sale (POS) terminal, detecting a game identification code associated with each such requested lottery game ticket; and instructing an automated lottery game ticket printer to print the desired type of lottery game tickets therefrom.

* * * * *